United States Patent
Aslanian, Jr.

(10) Patent No.: US 7,702,542 B2
(45) Date of Patent: Apr. 20, 2010

(54) ELECTRONIC CARDS SYSTEMS AND METHODS

(75) Inventor: John R. Aslanian, Jr., Scarsdale, NY (US)

(73) Assignee: Lions & Bears LLC, Port Chester, NY (US)

(*) Notice: Subject to any disclaimer, the term of this patent is extended or adjusted under 35 U.S.C. 154(b) by 1448 days.

(21) Appl. No.: 10/811,390

(22) Filed: Mar. 29, 2004

(65) Prior Publication Data

US 2004/0254859 A1 Dec. 16, 2004

Related U.S. Application Data

(60) Provisional application No. 60/492,964, filed on Aug. 7, 2003, provisional application No. 60/457,997, filed on Mar. 28, 2003.

(51) Int. Cl.
G06Q 30/00 (2006.01)

(52) U.S. Cl. ............................... 705/26; 705/37

(58) Field of Classification Search ................ 705/26, 705/37
See application file for complete search history.

(56) References Cited

U.S. PATENT DOCUMENTS

| 5,513,117 | A | 4/1996 | Small |
| 5,737,729 | A | 4/1998 | Denman |
| 5,983,200 | A | 11/1999 | Slotznick |
| 6,108,640 | A | 8/2000 | Slotznick |
| 6,141,666 | A | 10/2000 | Tobin |
| 6,360,221 | B1 | 3/2002 | Gough et al. |
| 6,453,300 | B2 | 9/2002 | Simpson |
| 6,836,792 | B1 * | 12/2004 | Chen ........................... 709/220 |
| 7,203,726 | B2 * | 4/2007 | Hasegawa .................... 709/206 |
| 2001/0007098 | A1 | 7/2001 | Hinrichs et al. |
| 2001/0007991 | A1 | 7/2001 | Tobin |
| 2001/0042089 | A1 | 11/2001 | Tobin |
| 2002/0002558 | A1 | 1/2002 | Krause |
| 2002/0077929 | A1 | 6/2002 | Knorr |
| 2002/0111875 | A1 | 8/2002 | Alolabi |
| 2002/0138363 | A1 | 9/2002 | Karas et al. |
| 2002/0152128 | A1 | 10/2002 | Walch et al. |

(Continued)

OTHER PUBLICATIONS

Aunt Esther's Secret, Aunt Esther's Never Ending Memory Calendar, May 13, 2003, 2 pages; www.year2year.biz.

*Primary Examiner*—James Zurita
(74) *Attorney, Agent, or Firm*—Rothwell, Figg, Ernst & Manbeck, P.C.

(57) ABSTRACT

A system for sending cards and/or gifts to one or more entity using a computer network is provided. The system can include a computer network with at least one client computer and at least one server connected to the network. The at least one client computer can have a user interface with which a user can input an entity-centric event date. The server can receive a signal from said client computer based on the user input of the event date. The server includes a time-from-event module that determines a non-yearly event date after said event date. The client computer displays the non-yearly event date and provides means for a user to purchase cards or gifts for an entity. In most preferred embodiments, the non-yearly event date is a month-from-birth date of the individual. In some preferred embodiments, the electronic cards include combined advertisements contained within the display regions of the electronic cards.

72 Claims, 34 Drawing Sheets

(e-card ads)

U.S. PATENT DOCUMENTS

| | | |
|---|---|---|
| 2002/0178078 A1 | 11/2002 | OToole |
| 2003/0036956 A1 | 2/2003 | Karas et al. |
| 2003/0050857 A1 | 3/2003 | Shaftel |
| 2004/0032393 A1 | 2/2004 | Brandenberg et al. |

* cited by examiner (homepage)

(homepage with illustrative calculator output)

(gifts for the month)

(delivery schedule)

FIG. 5
(choose a gift)

(member sign in)

(become a member)

FIG. 8
(reminder main page)

FIG. 9
(create an event)

(about page)

(trivia page)

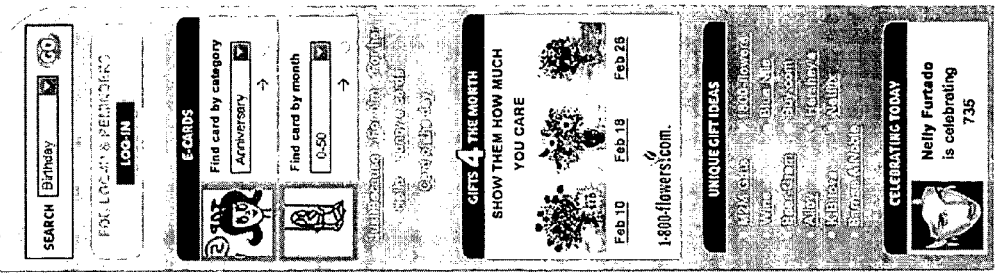
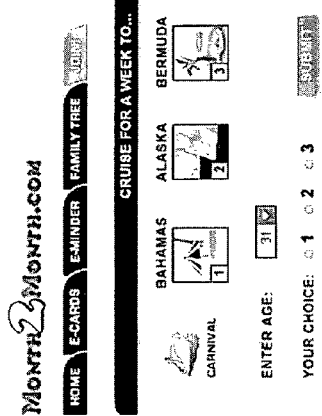
FIG. 12
(vacation page)

(shopping bag)

(item details)

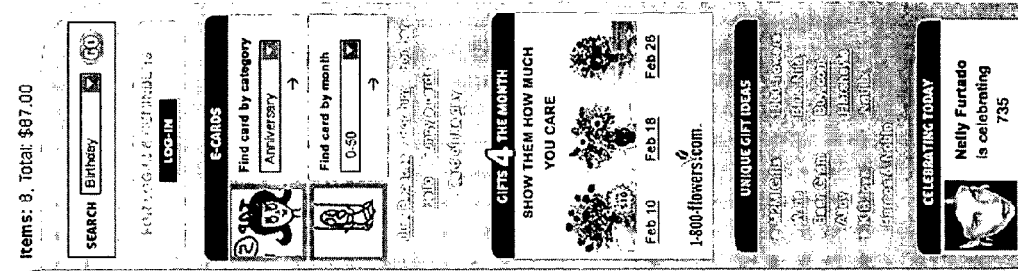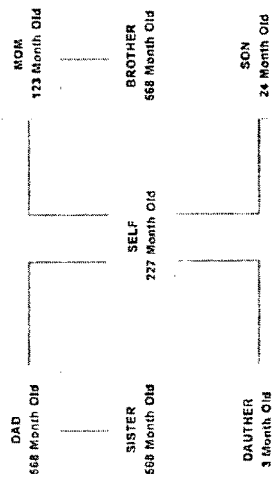
FIG. 15
(family tree)

(ecard main page)

(ecard search)

(ecard detail)

(shopping category)

FIG. 22
(Bluemountain.com)

(ecards.com)

(e-card ads)

(e-card ads)

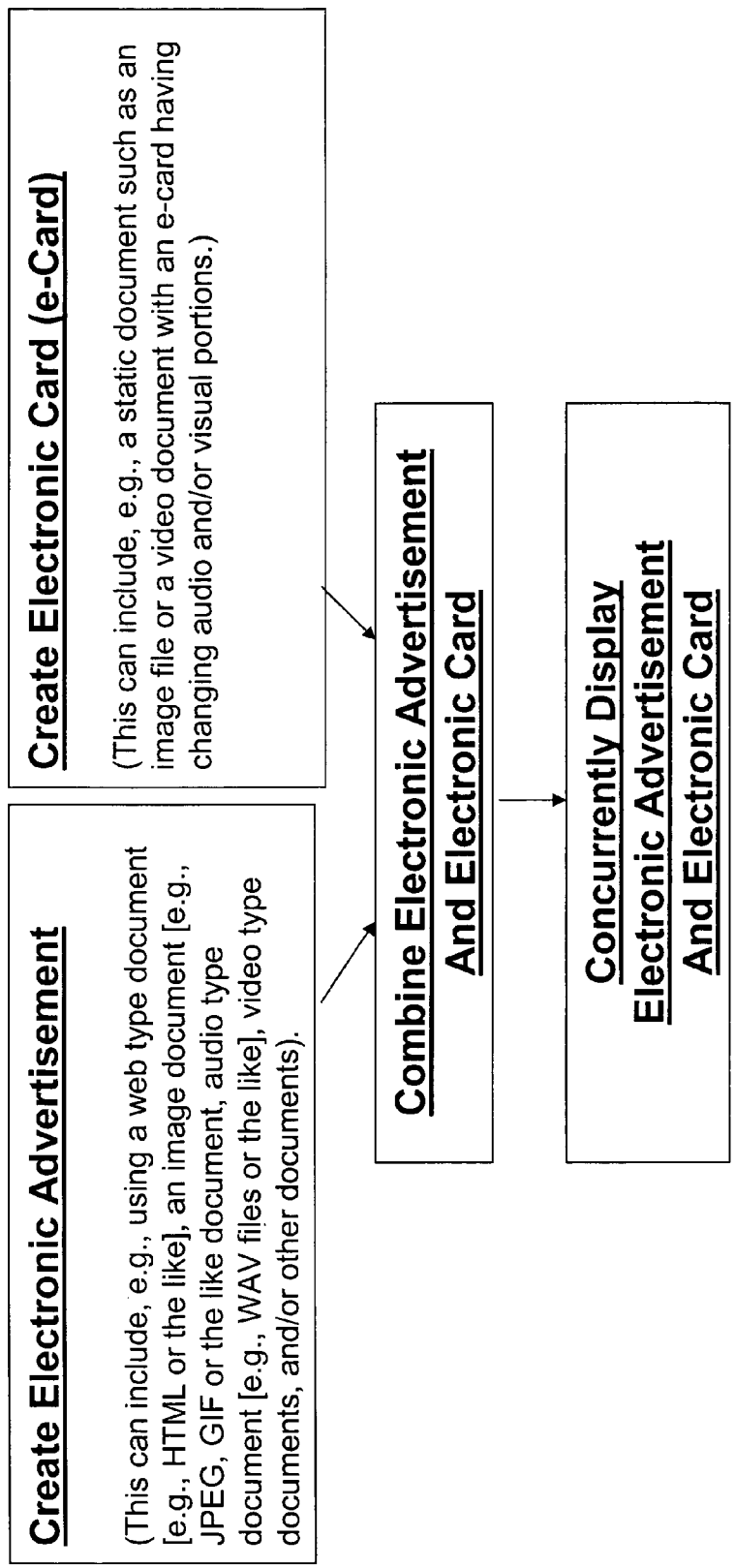
FIG. 25 (e-card ad creation)

ELECTRONIC CARDS SYSTEMS AND METHODS

Priority is claimed to U.S. Provisional Application Ser. No. 60/492,964 filed on Aug. 7, 2003 and to U.S. Provisional Application Ser. No. 60/457,997 filed on Mar. 28, 2003, the entire disclosures of which are each incorporated herein by reference.

BACKGROUND OF THE INVENTION

1. Field of the Invention

The preferred embodiments of the present invention relate to electronic cards systems and methods.

2. Description of the Related Art

Historically, people have honored one another through annual celebrations commonly known as "birthday celebrations." Birthdays have become a fundamental part of modern life. Birthday celebrations are widely practiced by people of all ages, from three-year-old children to centenarians. With these birthday celebrations comes the need or desire to purchase goods and/or services (e.g., presents, cards, etc.) for or on behalf of the celebrated individual or groups of individuals. As a result, annual birthdays are significant business generators.

However, generating revenues via birthday celebrations requires physical effort on behalf of those wishing to celebrate or honor others for their birthdays. Typically, the physical effort required involves: 1) finding, selecting, purchasing and/or delivering presents; and/or 2) obtaining, preparing and/or delivering cards (the terminology "card" herein is not limited to any medium, but includes any medium with which an individual can communicate a message to a celebrated person—e.g., whether the message is visually (e.g., in text, video, or other visual form), audibly and/or otherwise communicated.

In that regard, throughout most of the $20^{th}$ century, consumers usually needed to physically enter an establishment to purchase goods and/or services. Similarly, in order to communicate in writing with another person, one usually needed to physically draft a card and deliver the same to the other person. Now, in the $21^{st}$ century, computer networks, such as the Internet, provide a new medium through which consumers can purchase goods and/or services and through which people can communicate in writing with one another, without significant physical activity.

In recent years, a number of Internet-based Web Sites have emerged that enable individuals to celebrate annual-birthdays, certain holidays and/or certain other occasions via electronically delivered greeting cards, such as, e.g., BLUEMOUNTAIN.COM (the Web Site "home page" of which is depicted in FIG. 1) and ECARDS.COM (the Web Site "home page" of which is depicted in FIG. 2). While existing electronic card (ecard) Web Sites may simplify efforts needed to send electronic cards to people, using the Internet, they do not expand the existing "celebration" schema and do not realize the substantial revenue generation that can be achieved through the use of the Internet or other computer networks in relation to individual-centric celebrations (the terminology individual-centric used herein means related to an individual or group of individuals, such as, e.g., years from an individual's birth—some individual-centric events may relate to a plurality of individuals, such as, by way of example, a marriage). Some illustrative systems and/or methods are shown in the following U.S. patents, the entire disclosures of which are incorporated herein by reference in their entireties: U.S. Pat. No. 6,453,300 entitled Personalized Greeting Card With Electronic Storage Media And Method Of Personalizing Same, of CD Coupon, LLC; U.S. Pat. No. 5,513,117 entitled Apparatus And Method For Electronically Dispensing Personalized Greeting Cards And Gifts, of Blue Mountain, Inc.; U.S. Pat. No. 6,108,640 entitled System For Calculating Occasion Dates And Converting Between Different Calendar Systems, And Intelligent Agent For Using Same; and U.S. Pat. No. 5,737,729 entitled Interactive Kiosk For Selecting And Sending Mail Pieces.

To date, existing methods of celebration have been significantly hindered by human limitation. We celebrate annular birthdays because they are easy to celebrate. The dates are easy to remember; one only needs to recall a particular date, such as, e.g., Jan. 1, 2000. When that date arrives, it is understood to be time to celebrate.

The preferred embodiments of the present invention provide a computer system and/or method that breaks free from existing hindrances—not only improving society through additional forms of celebration, but providing a platform upon which to generate substantial new revenue and business.

SUMMARY OF THE PREFERRED EMBODIMENTS

The preferred embodiments of the present invention have been developed in view of the above mentioned and/or other conventional problems.

In some preferred embodiments, rather than merely celebrating "annual" birthdays, a system and method is provided that enables individuals to celebrate various other time-based entity-centric events. In this disclosure, the terminology entity can include any type of entity including, e.g., a human, an organization, a company, an animal or pet, a real entity, an imaginary entity and/or any other entity. In the most preferred embodiments, the system and method facilitates the celebration of "months" from the date of one's birth. In some other preferred embodiments, the system and method facilitates the celebration of one or more of the following time-based individual-centric events, months from an event (e.g., from birth), bi-weeks from an event, weeks from an event, minutes from an event, and/or seconds from an event. In some other preferred embodiments, the system and method facilitates the celebration of any other atypical time-based individual-centric events, such as, e.g., the number of, by way of example, third Tuesdays from an event, the number of full moons from an event, etc., the number of solar eclipses from an event, and so on.

In some preferred embodiments, the system and method provides for at least one additional time-based individual-centric event beyond the typical birthday celebration. In preferred embodiments, the system and method provide for additional revenue generation in relation to the at least one additional time-based individual-centric event.

In some preferred embodiments, a system for sending cards and/or gifts to one or more celebrated entity using a computer network is provided that includes: a computer network including at least one server that is capable of communicating with at least one client computer; the server being configured to cause the at least one client computer to present a user interface with which a user can input at least one entity-centric event date; and the server being configured to receive a signal from the client computer based on the user input of the event date, the server including a time-from-event module that determines a non-yearly event date based on the event date, and the server transmitting a non-yearly event date signal for at least one of the at least one client computer. In some embodiments, the non-yearly event date is a month-from-birth date of an individual.

In some preferred embodiments, a system for sending cards and/or gifts to one or more celebrated entity using a computer network is provided that includes: a computer network including at least one server that is capable of communicating with at least one client computer; the server being configured to cause the at least one client computer to present a user interface with which a user can input data; and the server computer configured to cause an electronic card to be displayed on a display screen of at least one of the least one client computer, the electronic card being in a electronic card region of the display screen and including an advertisement region in the electronic card region of the electronic card. In some embodiments, the advertisement region is fixed with respect to the electronic card region and in some embodiments the advertisement region moves with respect to the electronic card region.

In some preferred embodiments, a method for making a combined e-ad and e-card product that is presented to a recipient using a computer network includes: creating electronic card data; creating electronic ad data; combining the electronic card data with the electronic ad data; displaying with the combined data a combined e-ad and e-card product with the e-ad integrated within the e-card.

In some preferred embodiments, a method for the electronic distribution of advertisements includes: providing an on-line interface with which a user can select one or more advertisement from a set of advertisements; incorporating the one or more selected advertisement into an electronic communication to a recipient known to the user; and awarding the user valuable consideration for delivery of the electronic communication to the recipient. In some embodiments, the set of advertisements is a plurality of advertisements, or, in some embodiments, more than 10 advertisements, or, in some embodiments, more than 100 advertisements, or, in some embodiments, more than 1000 advertisements. In some embodiments, the electronic communications include e-cards, e-invitations and/or e-mails. Preferably, the valuable consideration includes allowing the user to send the electronic communication with a reduced cost or no cost or accounting for having a payment rendered to the user. Preferably, the advertisement relates to a product or service that is secondary to a purpose of the e-card.

In some preferred embodiments, an electronic network system including at least one electronic device capable of transmitting and receiving data is provided that includes: at least one electronic device including a processor, memory, a display; the at least one electronic device including means for inputting an event date via a user interface and for transmitting an event date signal related thereto over the electronic network to a server computer; the at least one electronic device including means for receiving a non-yearly event age signal from the server computer in response to the transmitting the event date signal; and the at least one electronic device including means for displaying non-yearly event age information based on the non-yearly event age signal.

In some preferred embodiments, a computer system is provided that includes: at least one first client device configured to communicate over a network with at least one server; the at least one client device having a processor, memory, and a display; the at least one client device including means for user selection of an electronic card from a plurality of electronic cards for delivery to at least one recipient, the electronic card having an electronic card region and an advertisement in the electronic card region, the means including a graphical user interface created using browser software executing on the at least one client computer in communication with the at least one server; at least one second client device configured to receive image and text data over the network for display to the at least one recipient of the selected electronic card with the electronic card region and the advertisement in the electronic card region. In some embodiments, the advertisement relates to a product or service secondary to a purpose of the electronic card.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The accompanying figures are provided by way of example, without limiting the broad scope of the invention or various other embodiments, wherein:

FIGS. 1-19 are screen shots of computer displays of illustrative web pages that can be employed in some illustrative embodiments of the present invention;

Figure 22:
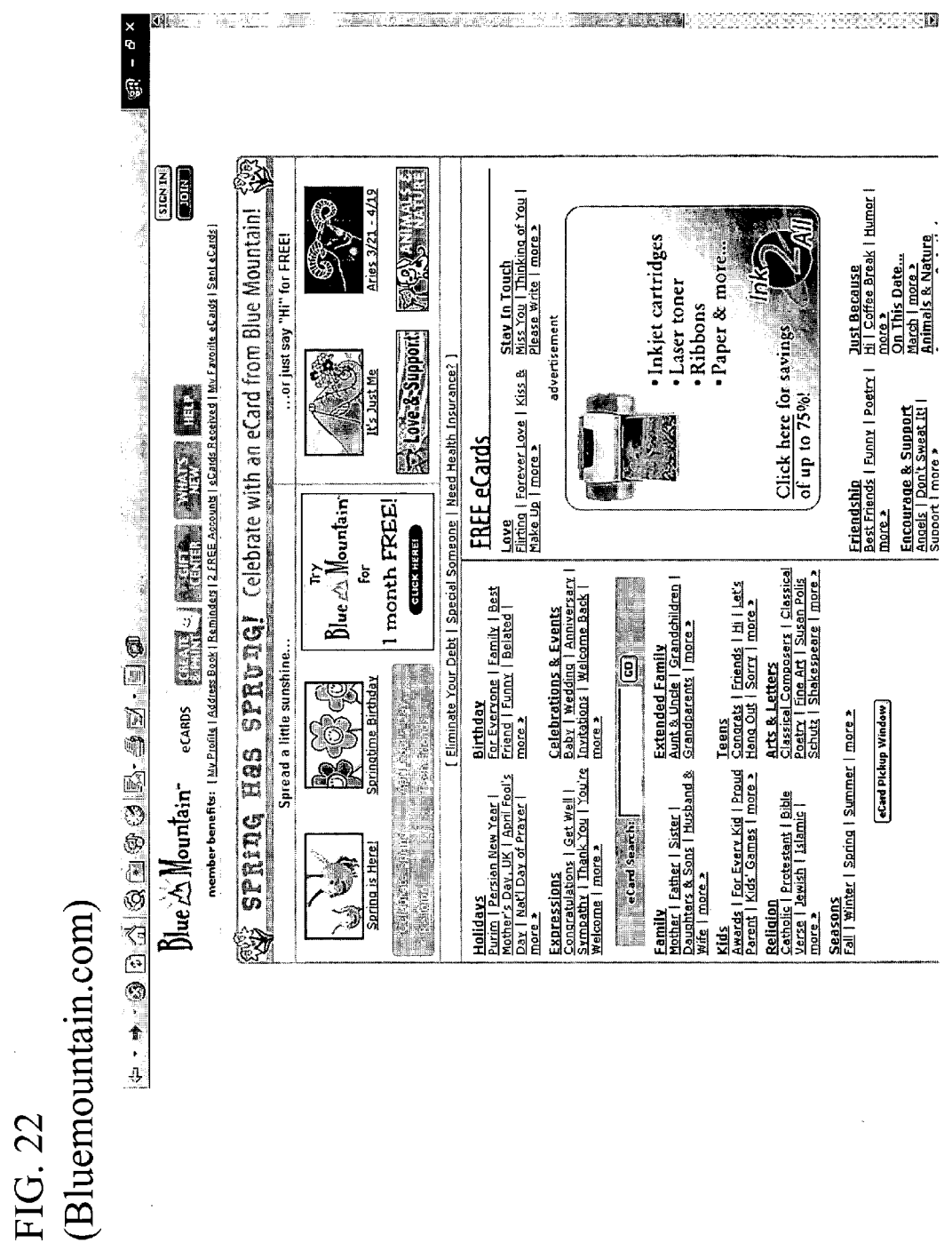

FIGS. 22-23 are screen shots of computer displays for web site home pages of some background systems;

FIG. 25 is a flow diagram showing the creation of combined e-advertisements/e-cards in some illustrative embodiments;

DETAILED DESCRIPTION OF THE PREFERRED EMBODIMENTS

Preferred Systems

The preferred embodiments of the invention can be implemented on one or more computer(s) and/or one or more network of computer(s), such as a local area network (LAN), a wide area network (WAN), the Internet and/or another network. In various embodiments, one or more server(s), client computer(s), application computer(s) and/or other computer(s) can be utilized to implement one or more aspect of the invention. Illustrative computers can include, e.g.: a central processing unit; memory (e.g., RAM, etc.); digital data storage (e.g., hard drives, etc.); input/output ports (e.g., parallel and/or serial ports, etc.); data entry devices (e.g., key boards, etc.); etc. Client computers may contain, in some embodiments, browser software for interacting with the server(s), such as, for example, using hypertext transfer protocol (HTTP) to make requests of the server(s) via the Internet or the like.

In some preferred embodiments, the system utilizes relational databases, such as, e.g., employing a relational database management system (RDBMS) program to create, update and/or administer a relational database. The RDBMS may take Structured Query Language (SQL) statements entered by a user or contained in an application program and create, updates and/or provides access to database(s). Some illustrative RDBMS's include ORACLE's database product line and IBM's DB2 product line. In some illustrative embodiments, one or more client computer can be provided, which can include separate client systems, LAN-based systems, and/or various other client systems. The client computer(s) can include an appropriate operating system, such as, for example, WINDOWS NT or another system. In preferred embodiments, the system is adapted to provide an object based graphical user interface (GUI).

Figure 20:
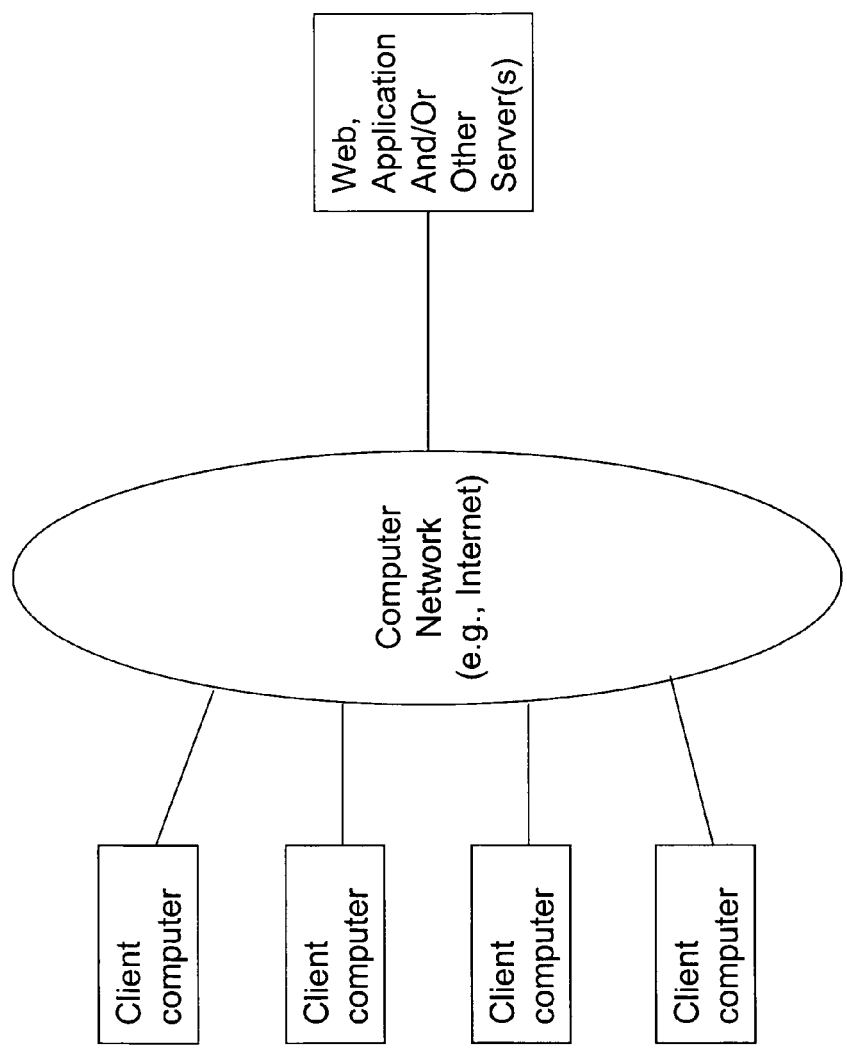
FIGS. 20-21 are schematic diagrams depicting some illustrative systems with which embodiments of the present invention can be implemented.

In some preferred embodiments, the system provides a multi-user client server system, such as, e.g., in the embodiment shown in FIG. 20. In some preferred embodiments, users are provided with a graphical user interface that is presented to the users via client computers. In some embodiments, the graphical user interface enables the importing and/or exporting of data or information.

Figure 21:
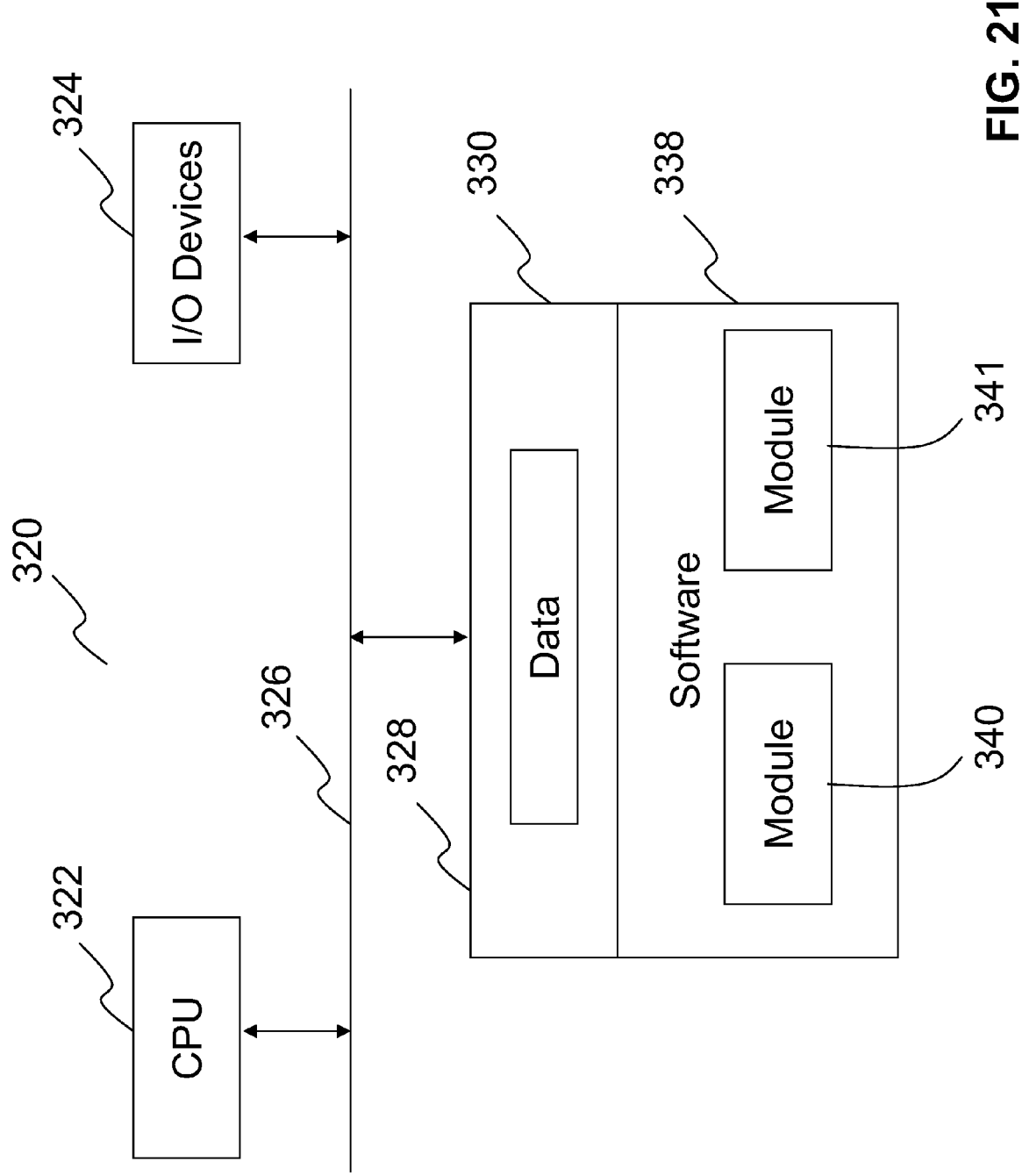
Figure 23:
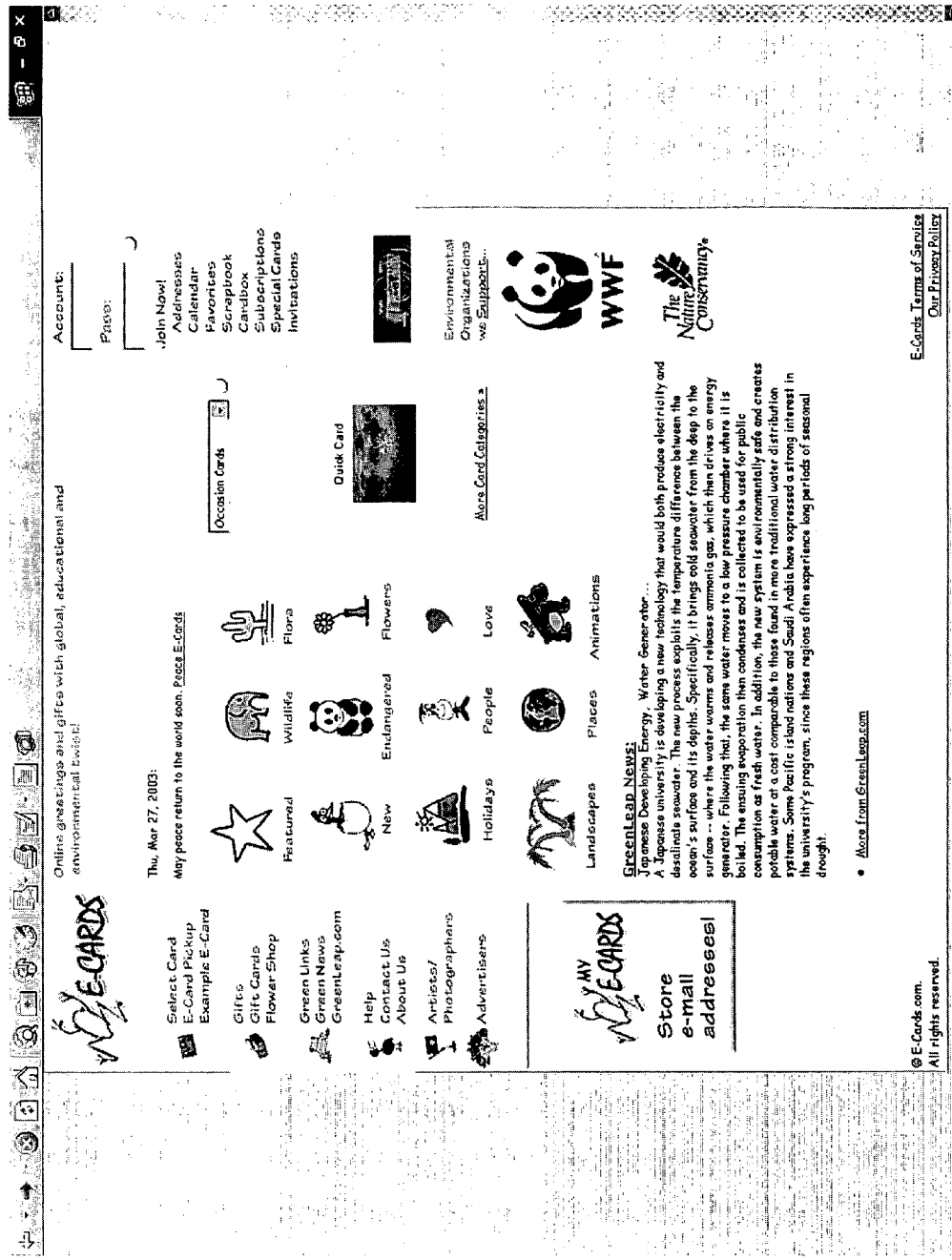

FIG. 21 shows an illustrative computer 320 that can be used to implement computerized process steps in some embodiments of the invention. In some embodiments, the computer 320 includes a central processing unit (CPU) 322, which can communicate with a set of input/output (I/O) device(s) 324 over a bus 326. The I/O devices 324 can include, for example, a keyboard, mouse, video monitor, printer, and/or other devices.

The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, in some examples, calendar data, event data and/or other data 330. The memory 328 can also store software 338. The software 338 can include a number of modules 340 for implementing the steps of processes. Conventional programming techniques may be used to implement these modules. Memory 328 can also store the above and/or other data file(s).

In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. The medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

Preferred Embodiments

FIGS. 1-20 illustrate various aspects that may be employed in some preferred embodiments of the invention. In the most preferred embodiments, an Internet Web Site is provided that can be accessed by remote client computers, such as by various user computers, including those operated by individual consumers, whether at a home location or at a business location. FIGS. 1-20 show some illustrative web pages or screen shots that can be presented to users. The web pages present information and graphical user interfaces through which users can access new pages (e.g., via hyperlinks), select from a list of options (e.g., via drop down menus), make selections (e.g., via check-boxes), input data or text (e.g., via text boxes) and/or perform other common GUI functions as would be understood to those in the art based on this disclosure.

Figure 1:
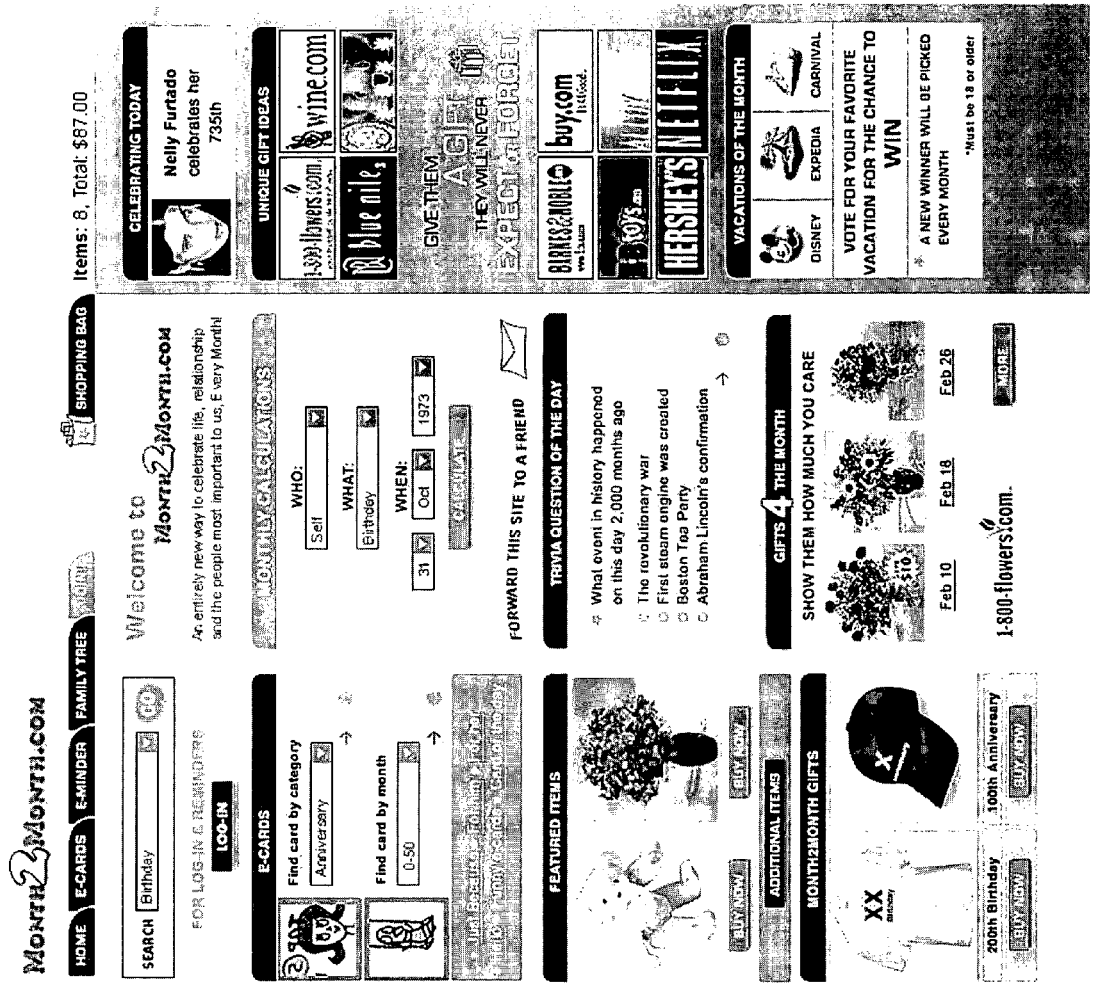

FIG. 1 shows an illustrative "home page" that can be displayed to a user upon accessing a main URL of a Web Site, such as, e.g., http://www.month2month.com. As shown, the home page is preferably presented in a manner to allow the user to select a plurality of web pages, such as, a home page, an e-cards page, an e-minder page, a family tree page and a join page.

As shown, the home page preferably provides one or more, preferably all, of the following features.

A SEARCH feature, with which a user can insert text into a text box and/or use a drop down menu to locate portions of the Web Site content.

Figure 6:
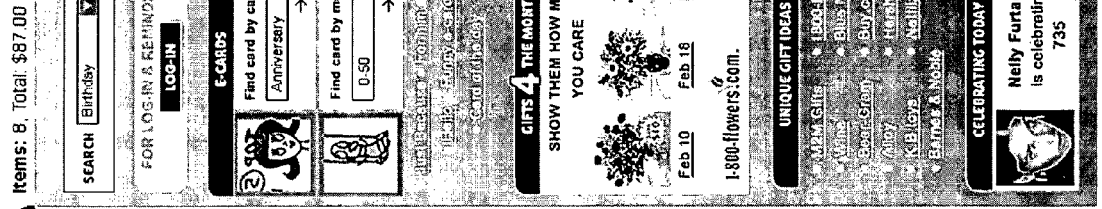

A LOG-IN feature, with which a user can be presented with a member sign-in login page (such as, e.g., shown in FIG. 6).

An E-CARDS locator feature, with which a user can locate e-cards, such as, e.g., by category as shown (e.g., using a drop down menu or the like), by suggested cards of the month (e.g., using a drop down menu or the like), by clicking on a particular link to card categories, such as, by way of example, "JUST BECAUSE," "FOR HIM," etc., as shown.

A FEATURED ITEMS feature, with which users can identify special items that may be purchased, such as, e.g., special discount items or the like. In some instances, special items can be identified by the web site provider automatically for particular individuals based on demographic information, such as, e.g., gender, age, occupation, interests, location and/or other information.

A GIFTS feature (such as, e.g., a MONTH2MONTH GIFTS feature as shown), with which specific items can be identified by the Web Site provider for particular occasions, such as, e.g., for particular monthly designations in some preferred embodiments. For example, the Web Site can identify a number of suggested gifts for various months-from-birth dates, such as, e.g., as depicted, $100^{th}$, $200^{th}$, and so on, months-from-birth dates. Additionally, as shown, the user can be provided with a link to enable the user to purchase the goods or services via their client computer (e.g., on-line) using any known on-line payment methods, such as, e.g., by way of example, via credit card, virtual wallets, e-certificates, systems such as PAYPAL.COM and/or any other payment methods.

Figure 2:

A CALCULATOR feature (such as, e.g., a MONTHLY CALCULATOR feature shown), with which a user can input an initial event date and can receive an output based on a calculation performed in an engine or module (preferably, e.g., at the server), which output can present, for example, one or more date or time upon which certain celebratable events should take place, such as, e.g., a 200 month-from-birth date or the like. In the embodiment shown in FIG. 1, a user can enter an individual's name at WHO, to identify an individual-centric event, and the user can select what the particular event is at WHAT, to identify what the date of original event is, such as, e.g., a date of birth. Then, the system runs a calculation and presents one or more celebratable events. For example, as shown in FIG. 2, an illustrative output could be to present an individual's present age and one or more date of interest (e.g., the individual being the particular user in the displayed embodiment and the present age being 227 months). In some embodiments, a user can identify what forms of celebratable events are desired to be displayed, such as, e.g., by way of example: forthcoming (i.e., the next or relatively near) month-from-birth dates; weeks-from-birth dates; days-from-birth dates; and/or the like. In some embodiments, the user can request that the system identify specific forthcoming dates, such as the individual's 100, 200, 300, 400 and/or the like month-from-birth dates. Moreover, upon determinations thereof by the engine or module, the user can preferably cause the system to save or store one or more particular celebratable events. In this manner, the user can either return to the Web Site to view such events at a later date and/or the system can be programmed to perform a particular action upon the occurrence of such a celebratable event. For example, the system can be programmed to a) send an ecard to a particular email address of an individual proximate in time to that occurrence, b) to have a particular gift delivered proximate in time to that occurrence, and/or the like. In some preferred embodiments, a user can store data and information pertaining to a plurality of individuals and can select particular items to be delivered and/or sent to individuals upon the occurrence of particular events. For example, in some illustrative embodiments, an employer could input a list of its employees and a list of presents and/or cards to be delivered to the employees at selected occasions, such as, by way of example only, at one-month from employment, at 6 months, at one year, at 20 months, etc. In some embodiments, the system can be used to identify specific dates of events based on a combination of time designations, such as, e.g., based on a combination of years, months, weeks, days and/or seconds information. For example, an individual might identify and, hence, celebrate the date of their $500^{th}$ month, $500^{th}$ minute and $500^{th}$ second.

Figure 3:
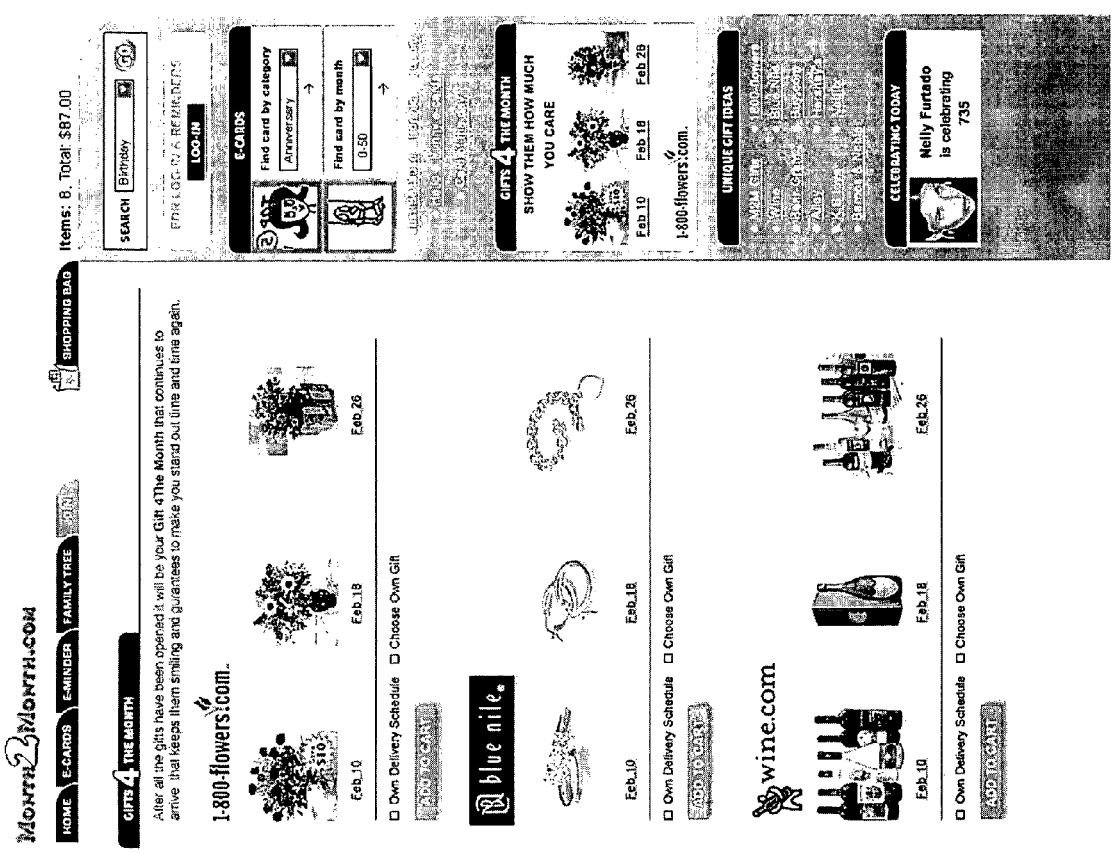
Figure 5:
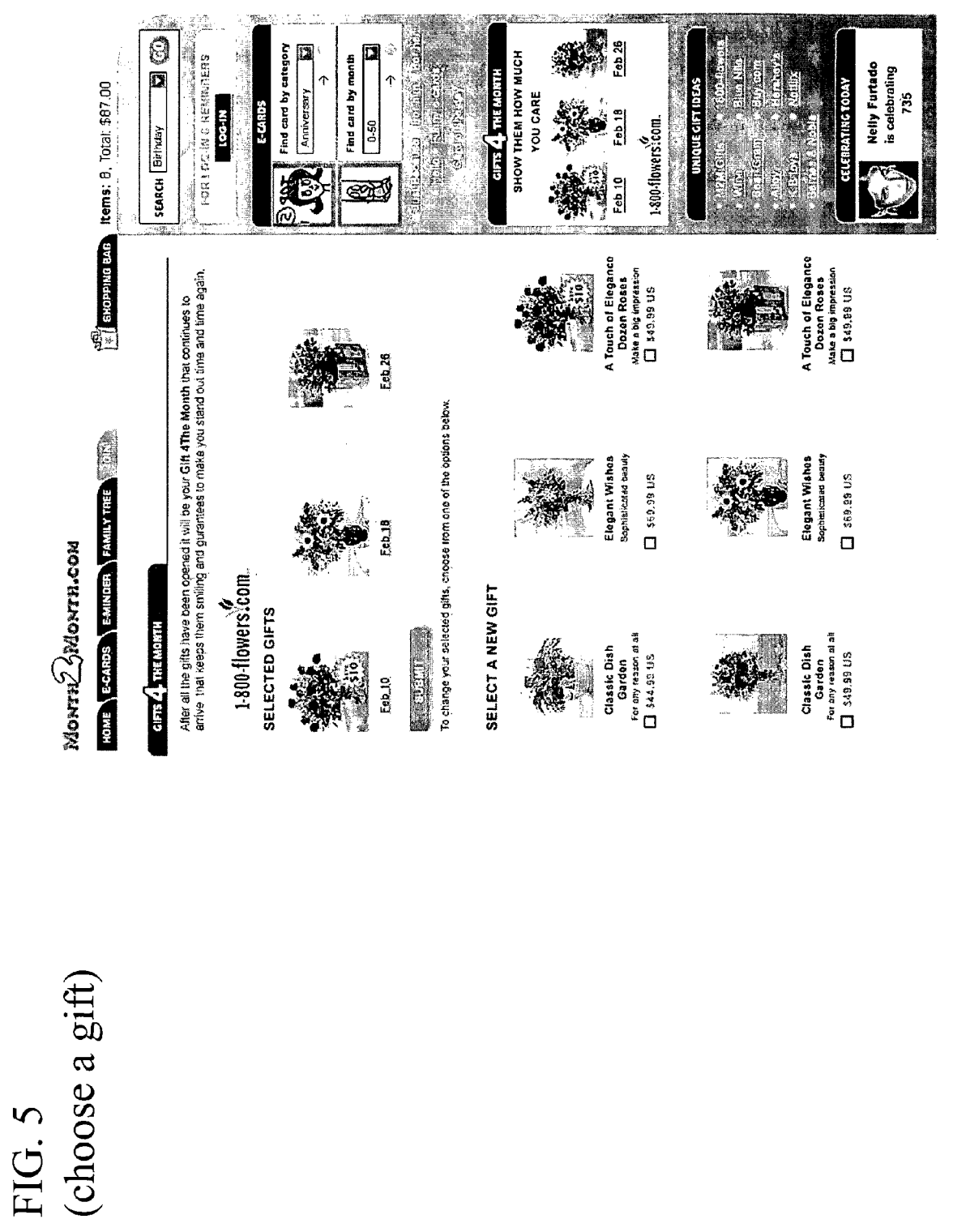
Figure 11:
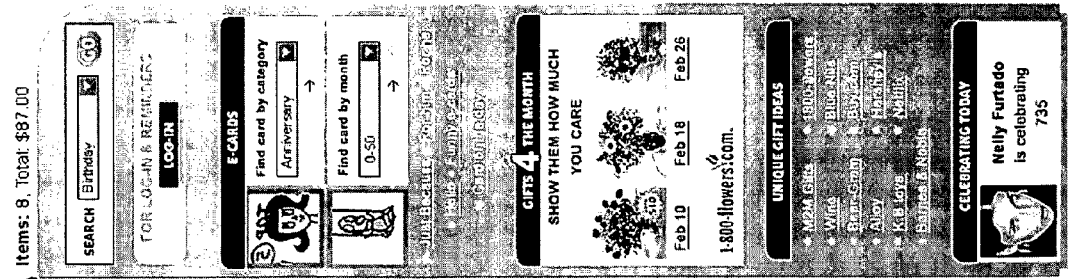

- A TRIVIA QUESTION feature, with which a user can be presented with a trivia question pertaining to a time designation of a type that can be calculated by the CALCULATOR feature. For example, in the most preferred embodiments, the system would present a trivia question regarding a particular event in time that occurred a particular amount of "months" in the past. Among other things, this can be used to help users appreciate, conceptualize and/or enjoy "month-from-date" designations or other time-from-date designations (e.g., other than yearly). FIG. 11 shows an illustrative screen that can be displayed upon a user's entry of an answer to a trivia question, including the user's answers compared to answers by other users.
- A GIFT FOR THE TIME PERIOD feature (such as, e.g., A GIFT FOR THE MONTH feature as shown in the illustrative embodiment), by which a consumer can have cards and/or presents delivered to an individual on multiple instances within a particular time period. For example, in preferred examples wherein individuals celebrate months-from-birth dates, the system can be used to send multiple gifts during a celebrated month time period. In contrast to typical birthday celebrations, which occur once a year and last for only one day, in preferred embodiments of the invention, the system can be used to celebrate "longer" duration periods (e.g., an entire month, or week or the like) and hence can accommodate the delivery of multiple cards and/or gifts over the time period. Moreover, the system does not require that a user wait for a year before a celebrated event can occur. In an illustrative embodiment, if, for example, a celebrated event is on Feb. 18, 2004, then the system can be used to effect the delivery of cards and/or presents on that date, as well as about one week before and/or about one week after that date (such as, on February 10, 18 and 26 in the illustrated example shown in FIG. 1). For example, in some illustrative embodiments, upon clicking a GIFTS FOR THE MONTH region, a user can be directed to a web page such as shown in FIG. 3, presenting a plurality of gift package options that can be purchased (e.g., adding to one's virtual shopping cart). As shown in FIG. 5, upon clicking on an appropriate link (such as, e.g., one or more of the links FEATURED ITEMS, MONTH2MONTH GIFTS, GIFTS 4 THE MONTH and/or UNIQUE GIFT IDEAS shown in FIG. 1, a user can be presented with a page presenting information regarding potential gifts, which can be easily selected, such as using GUI check boxes.
- A CELEBRATING feature (such as, e.g., a CELEBRATING TODAY feature as shown). This feature could be used to post information related to celebratable events pertaining to popular and/or newsworthy items, such as, e.g., celebratory events of famous individuals (such as, e.g., actors, musicians, politicians, etc). In preferred embodiments, the celebratory events include months-from-birth events.
- A GIFT IDEAS feature and/or ADVERTISEMENT feature, with which users can receive suggestions for gifts and/or observe advertisements for gifts, such as, e.g., goods and/or services (e.g., products, vacations, etc.). In some embodiments, the Web Site can display banner advertisements or links to other Web Sites. In some embodiments, when a user clicks on such a banner advertisement or link or is otherwise directed to another Web Site at which the user makes a purchase, the site of origin (i.e., the site implementing an embodiment of the present invention) can be identified (e.g., in any manner known in the art) to enable a small percentage, commission or other form of payment to be made to this site of origin. FIG. 12 is an illustrative vacation page that can be displayed to a user upon clicking, for example, VACATIONS OF THE MONTH, displayed on, e.g., the home page in FIG. 1. One advantage of the use of non-yearly designations of time, is the increased ability to have advertisers interested in providing discounts, deals and/or bargains for the time period. That is, companies often have day-long, week-long, and even month-long sales events. This form of advertisement would, thus, fit within acceptable business practices. Accordingly, there would be an increased chance to obtain strong deals and discounts for the appropriate time periods.

In contrast to year-from-birth celebrations commonly referred to as "birthdays," in some embodiments, by celebrating other times-from-event dates, the intervals of celebration can be a) closer together (e.g., more frequent or less than one year) and/or b) celebrated for a longer duration (e.g., for a longer time period, such as, e.g., an entire week or month). Thus, in some embodiments, an individual can celebrate their entry into their $200^{th}$ month (for example), their completion of their $200^{th}$ month (for example) and/or their entire $200^{th}$ month. In contrast, celebrations over the course of an entire year would be highly impractical and undesirable.

Figure 4:
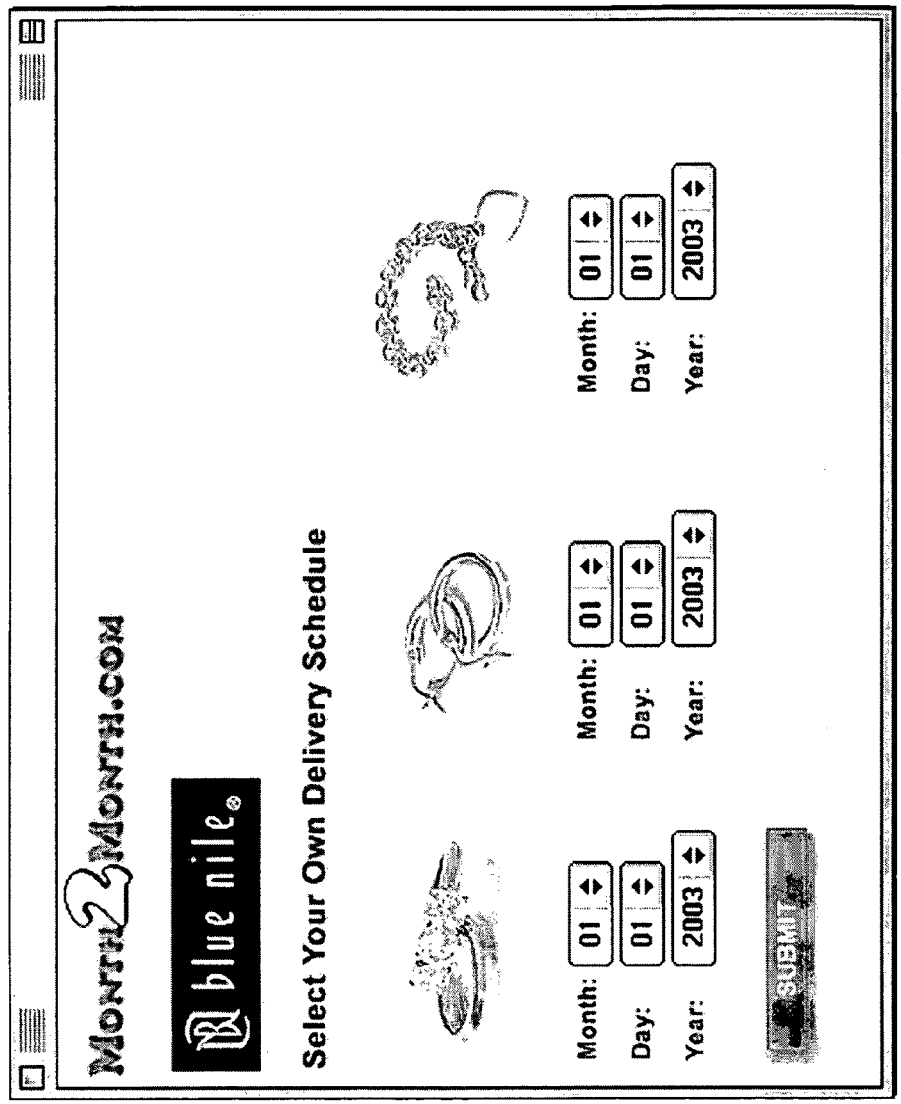

As shown in FIG. 4, in some preferred embodiments, upon selecting a card and/or gift item, a user can preferably select a particular delivery schedule for one or more items. Preferably, the individual can identify a particular day using a graphical user interface (such as, e.g., up and down arrows in the illustrative embodiment). In some embodiments, the system can start by displaying a proposed delivery date (such as, e.g., on the first day that begins a celebrated month or the like) and the user can modify the date(s) as desired.

Figure 7:
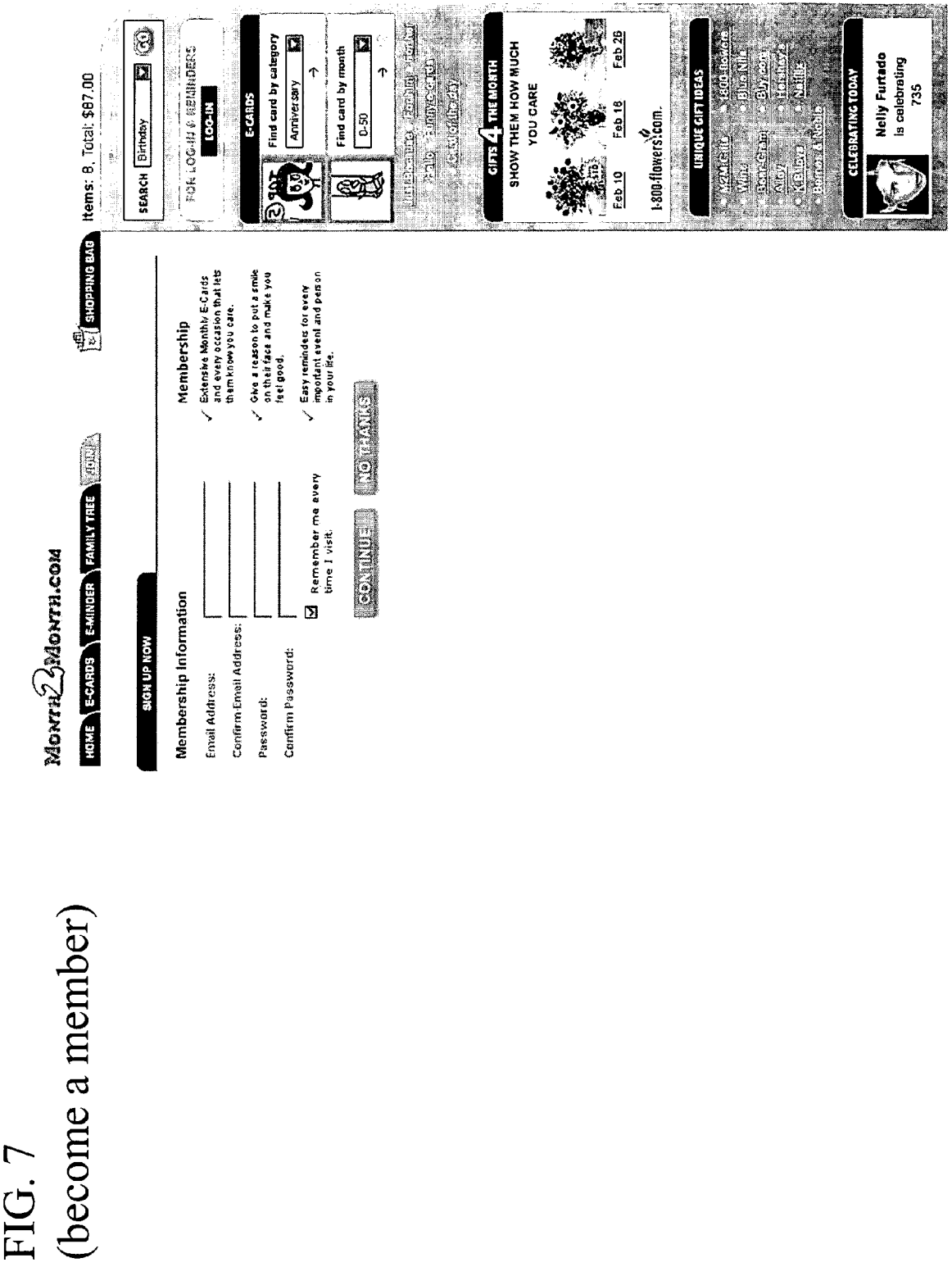

In some preferred embodiments, as shown in FIG. 7, a user must first sign-up to become a member. In some embodiments, the sign-up could include a subscription fee (e.g., a monthly fee, an annual fee and/or the like). In other embodiments, the sign-up could be free, but could be used to facilitate having the particular user create an account by which user specific information can be stored by the server and retrieved at a later date.

Figure 8:
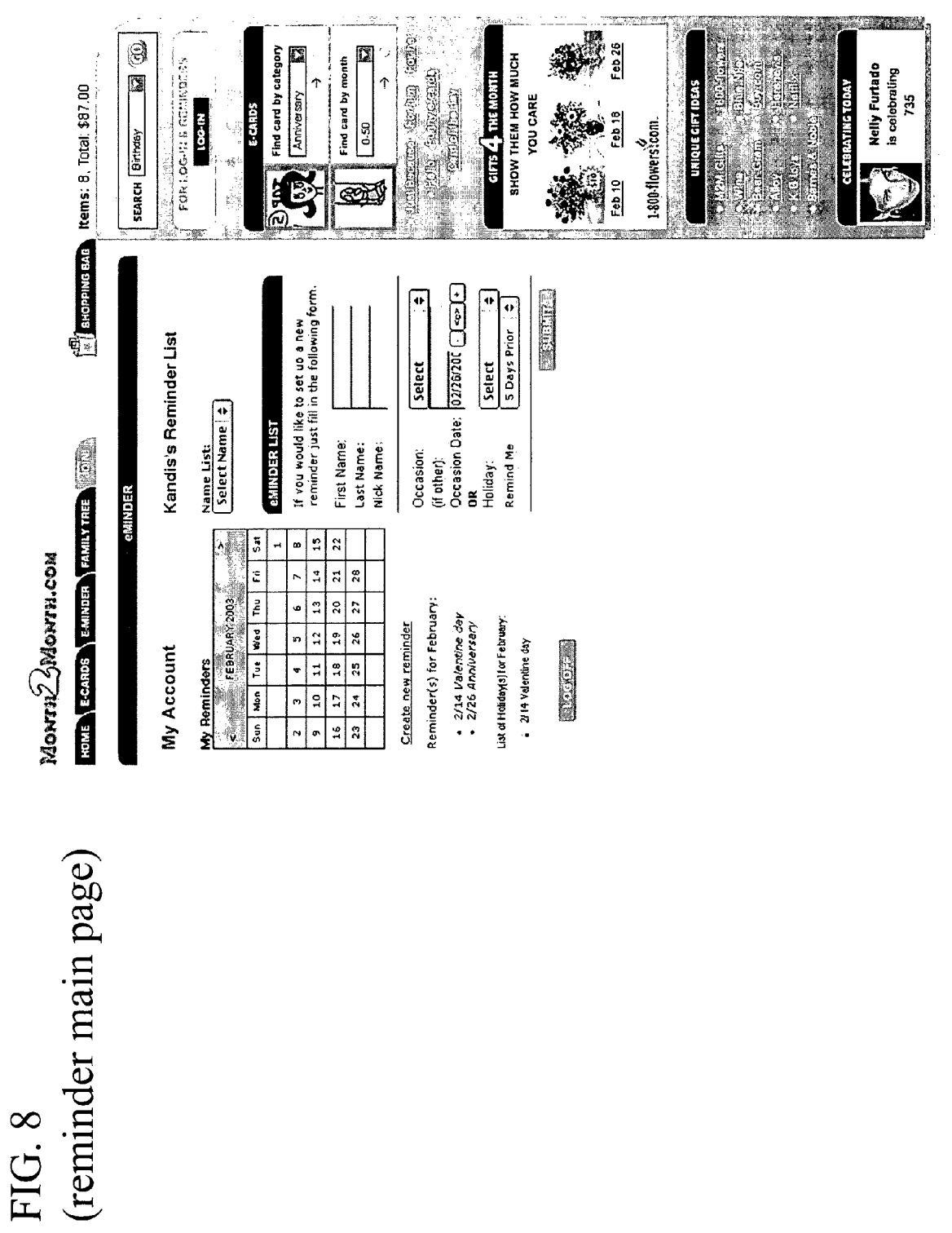
Figure 9:
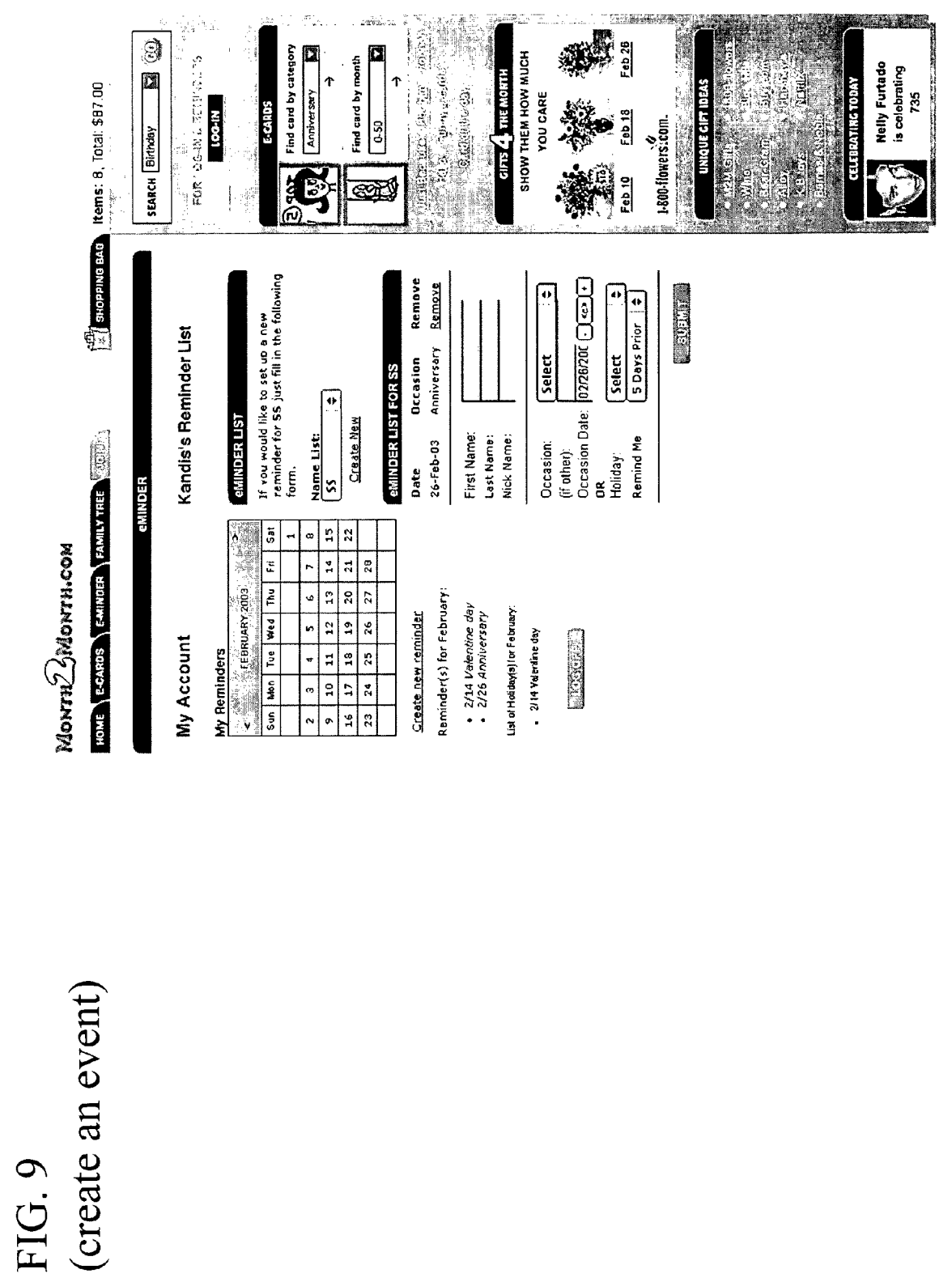

In some preferred embodiments, upon log-in, a user can be presented with personalized information. For example, FIGS. 8, 9 and 15 show some illustrative features that can, in preferred embodiments, be provided to users upon sign-in to their account. In particular, FIG. 8 shows a reminder main page, including a reminder feature referred to as an e-minder. As shown, the e-minder system preferably provides a graphical user interface having one or more, preferably all of the following features.

A NAME LIST feature, with which a user can select a particular name in relation to which a reminder is to be send (i.e., an individual in relation to which an individual-centric event reminder can be sent). As shown, the system preferably includes means to select one of a number of names from a displayed listed (e.g., using arrow keys in illustrative embodiments).
  AN ADD NAME feature, with which a user can add another individual to their list. For example, as shown, a user may add a First Name, a Last Name and/or a Nick Name in some embodiments.
  AN OCCASION feature, with which a user can select an occasion from a list and/or add the user's own occasion to the list.
  A HOLIDAY feature, with which a user can select a holiday from a list.
  AN OCCASION DATE selection feature, with which a user can input and/or modify a particular date of an event.
  A REMIND ME feature, with which a user can select and/or input a time period in advance of the input event for which to receive a reminder. In preferred embodiments, the reminder would be a reminder sent via e-mail to the e-mail address input during sign-in (see, e.g., FIG. 7).
  A CALENDAR feature, with which celebrated event dates can be stored and/or with which reminder dates can be stored. In this manner, a user can input information related to numerous individuals and can receive appropriate reminders (e.g., preferably, via email, but such reminders could be sent via other means, such as telephone, regular mail, etc.). In preferred embodiments, the calendar can have multiple selectable views (similar to, e.g., a calendar function in MICROSOFT OUTLOOK, LOTUS NOTES and other calendar programming, wherein a user can select various views (e.g., by year, by month, and/or by day)). For instance, in a month view, the particular dates can be, e.g., highlighted. Then, upon clicking the particular dates, a day view can be, e.g., presented showing details of an event.

FIG. 9 shows an illustrative web page that can be presented to a particular user, identified as Kandis in this example. In the illustrative example, one of the individuals on Kandis's list is identified as SS. FIG. 9 demonstrates an illustrative screen that can be shown in order to facilitate Kandis's creation of an event pertaining to SS.

FIG. 15 shows another web page that can be presented to a user. In this regard, in an illustrative embodiment, when a user signs in to the user's account and clicks on the tab FAMILY TREE, the user can preferably be directed to a tree "creator" with which a user can input information related to individuals within a particular group, such as, e.g., family, friends, co-workers, and/or other groups, and can create a "tree" depicting individuals in that group. While the preferred embodiment shows individuals listed on an image of a tree, other embodiments do not require an image of a tree to be depicted. Other embodiments can show a hierarchy, such as, e.g., based on time designations (e.g., months), and/or can enable a user to manipulate the relationship by, for example, moving items with respect to one another on the display screen and/or manipulating flow diagram connecting lines between individuals as desired.

In the embodiment shown in FIG. 15, a user can click on at least one of FAMILY, FRIEND and/or CO-WORKER, whereby the user's entry can be added to the respective family tree(s). Then, the user can select and/or input a title for the individual (such as, e.g., rank or relationship, such as FATHER as shown). Then, the user can input the name of the individual. Then, the user can input a particular date of an event related to that individual; in the illustrated embodiment, the event inputted is the individual's birthday. Upon clicking "add," the individual is then added to the tree. While the terminology "family" refers, in some preferred embodiments, to a user's biological relatives, the terminology "family tree" is used herein to identify any form of family tree, such as a biological family tree, a friends tree, a co-workers tree, etc. In preferred embodiments, the individuals are displayed on the tree by an identifier (e.g., names) and by a non-year-based time identifier, such as, e.g., by a number of months-from-birth. In preferred embodiments, the system retains the information so that upon reopening the family tree, the time identifier is automatically updated. For example, in embodiments where the time is shown in days, the numbers could preferably change daily. In some embodiments, the tree can even be dynamically updated such that the time can change dynamically during observation of the tree, such as, e.g. to update the tree display based on minutes and/or seconds.

Figure 13:
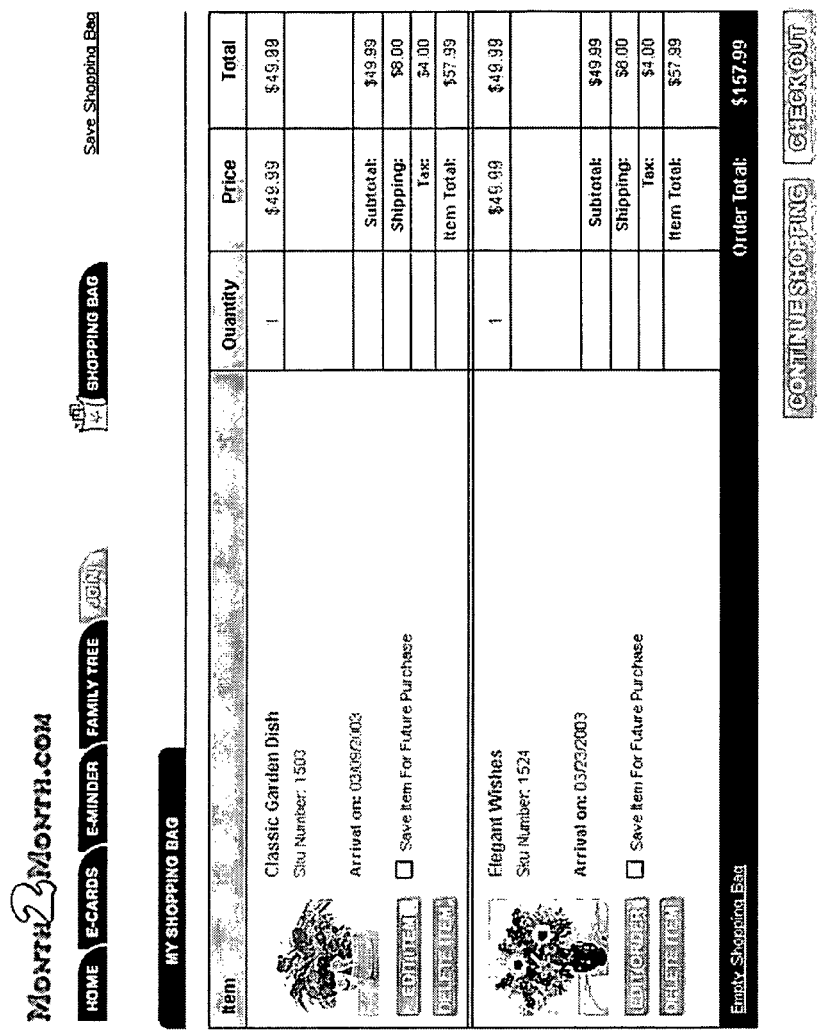
Figure 14:
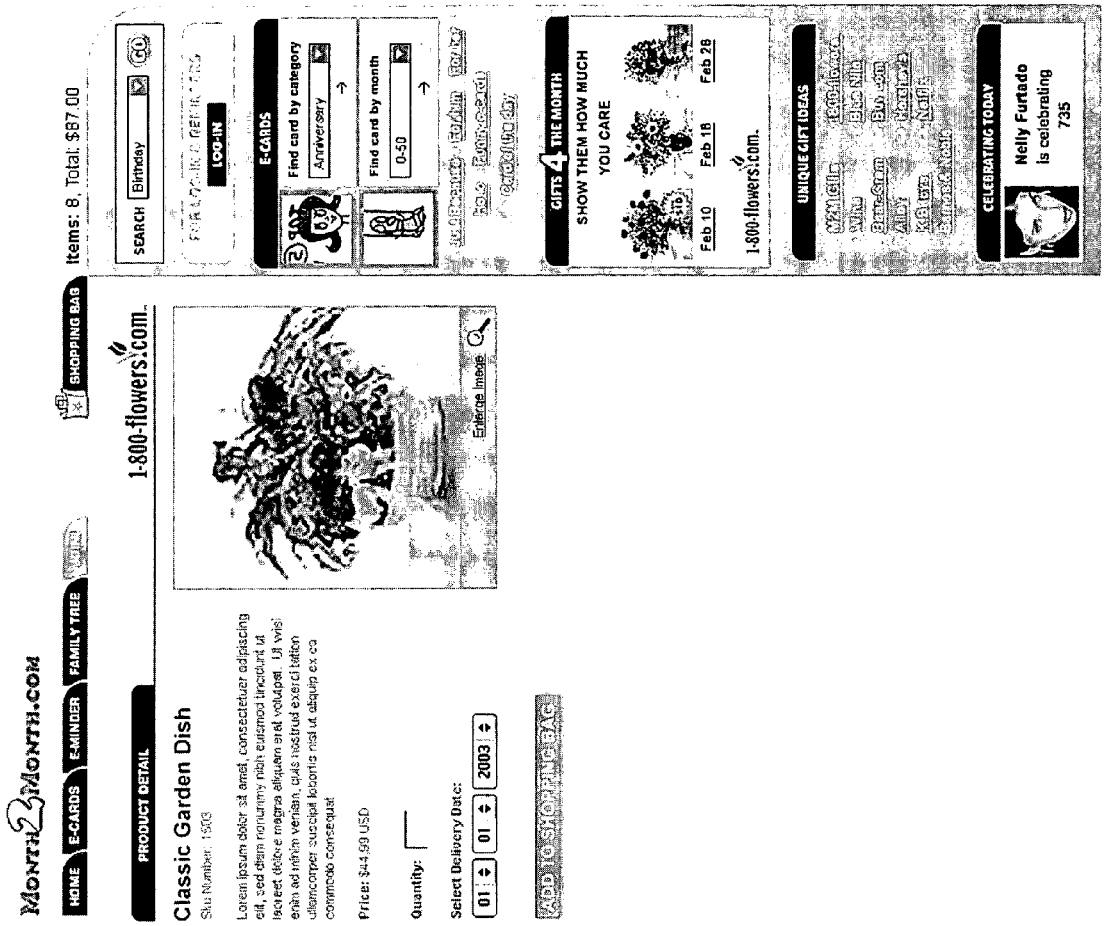
Figure 19:
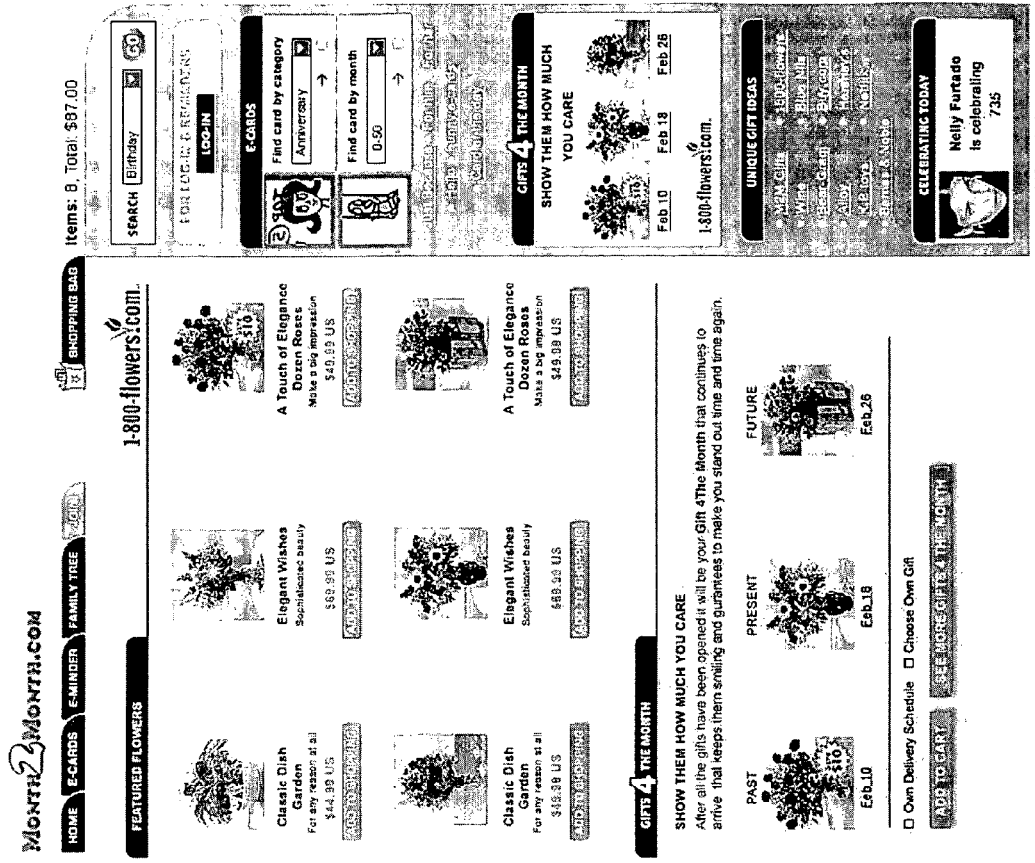

With respect to the purchasing of goods or services, FIG. 19 is an illustrative web page that can be display to a user when the user clicks on one or more links to inquire about potential purchases to be made. For example, upon clicking FEATURED ITEMS in FIG. 1, a user could be presented with this page in some embodiments. FIG. 13 is an illustrative view of a shopping bag web page that can be displayed to identify to the particular user, all of the items in their shopping bag. In some embodiments, different shopping bags can be used to collect items related to one particular individual, and, collectively, a plurality of shopping bags could be contained within a virtual shopping cart. In some embodiments, all of the items can be collected in a single shopping bag and/or a single shopping cart. FIG. 14 shows an illustrative product details sheet, along with a display of a price, a quantity input text box and a delivery date selection interface. In some embodiments, rather than and/or in addition to selecting a particular delivery date, a user can select to have the item delivered on a particular occasion, for one or more particular individuals; for example, the user can be presented with an interface having a name list to select from and also an event list to select from. Preferably, the event list will include events within a short window of time (such as, e.g., within a month) on default, but can preferably be expanded as desired to enable the user to request delivery for an event more than one month away (e.g., even a year or more, if it is technically feasible under the business circumstances).

Figure 16:
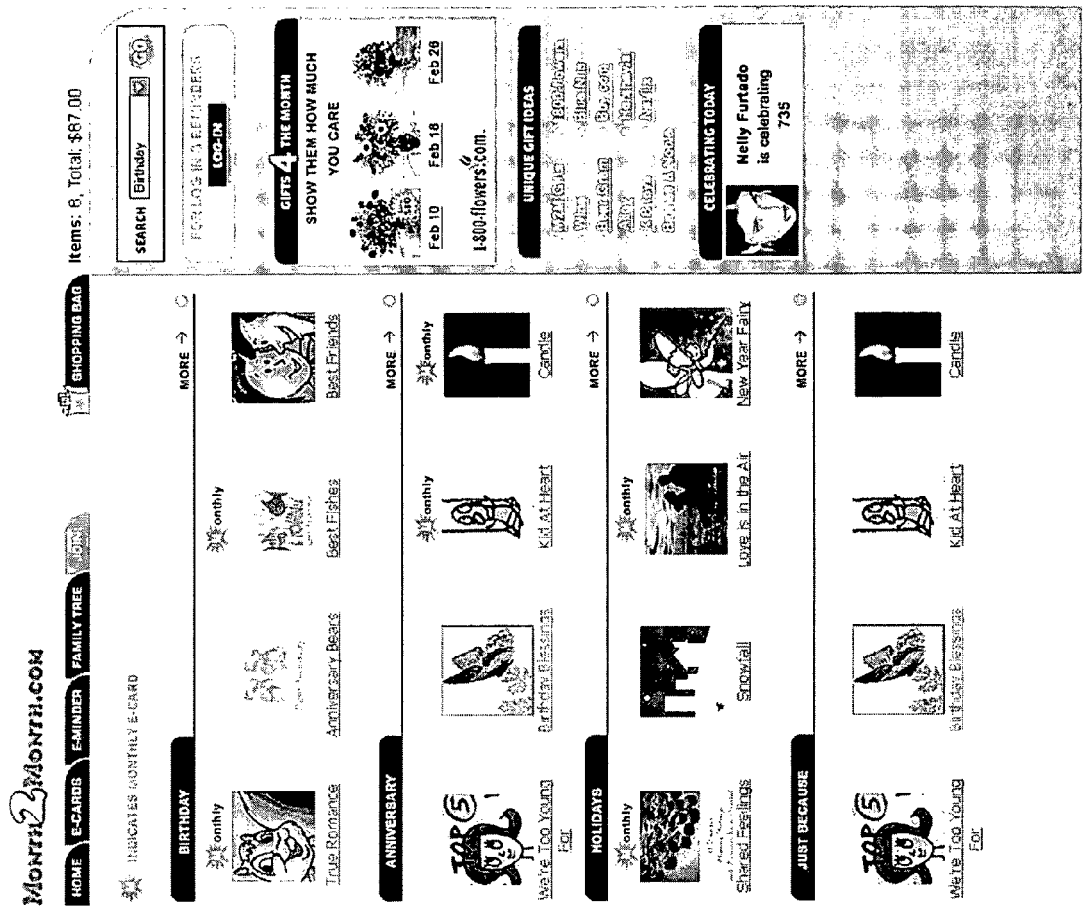
Figure 17:
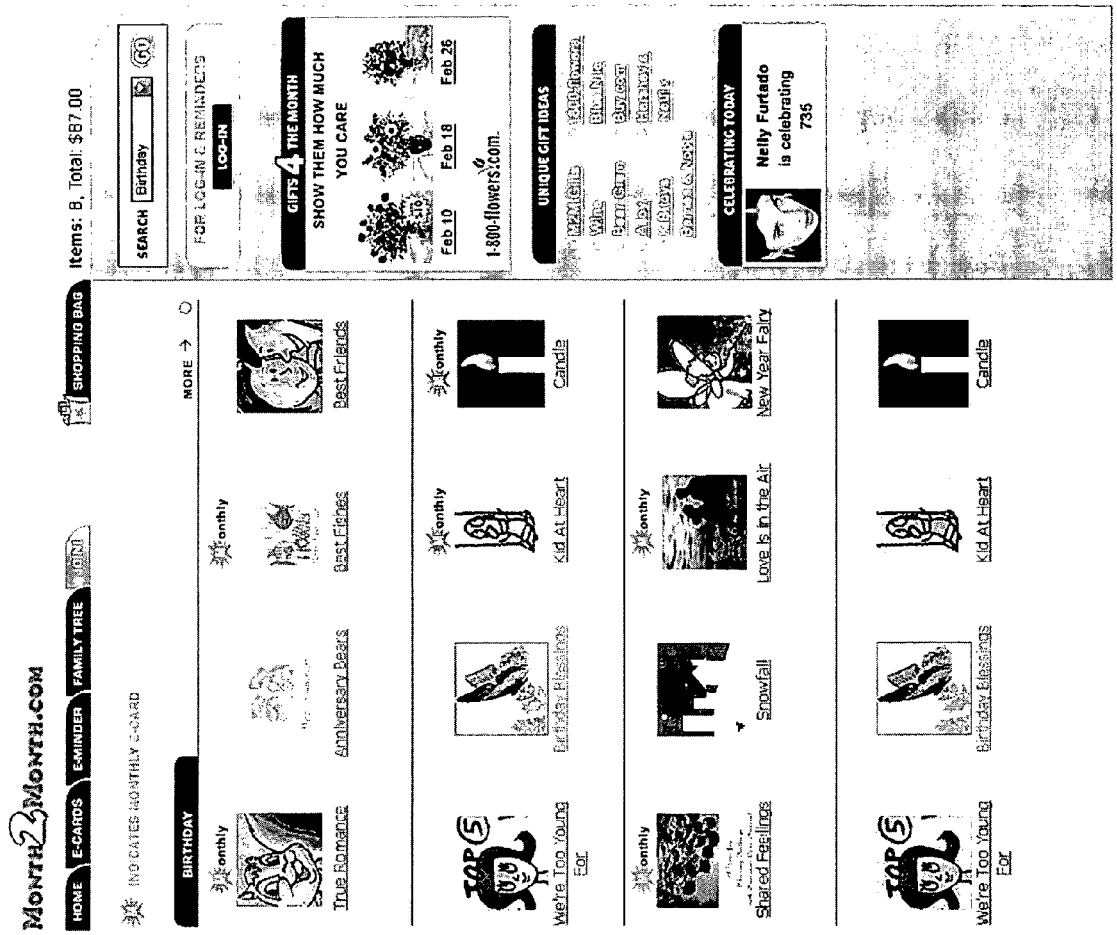
Figure 18:
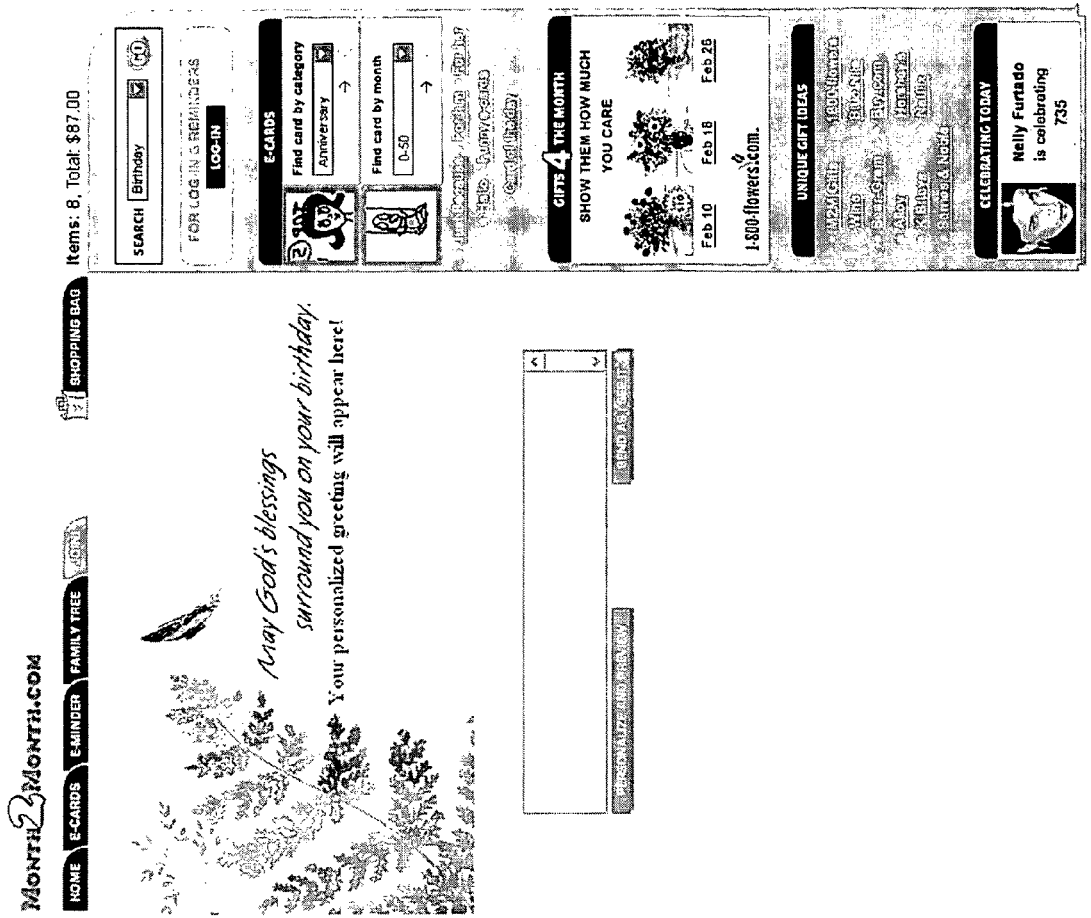

With respect to the purchasing and/or delivery of ecards, FIG. 16 shows an ecards main page at which a user is presented with a plurality of ecards to select from. Preferably, the ecards are selectable by category, such as, e.g., BIRTHDAY, ANNIVERSARY, HOLIDAYS, JUST BECAUSE, etc., as shown. FIG. 17 shows a number of ecards that can be displayed upon clicking on the tab "BIRTHDAY" shown in FIG. 16. FIG. 18 shows a screen that can be presented to a user in an illustrative embodiment once a particular ecard has been selected. As shown, the user is presented with one or more means to personalize the card, such as, e.g., by inputting text, by selecting colors, by selecting accompanying audio portions, etc.

Figure 10:
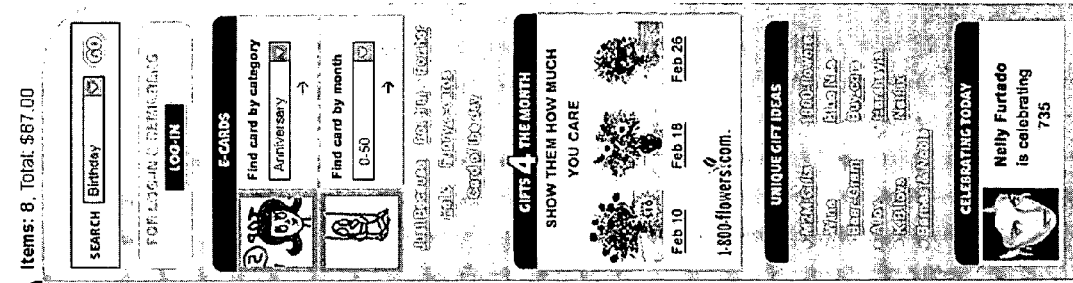

Lastly, FIG. 10 shows an illustrative "ABOUT" page that can be presented to a user upon clicking on a link provided (e.g., on the home page) to direct a user to information regarding the Web Site.

Integrated Advertisement Embodiments

In some embodiments, e-cards can be combined with advertisements. In this regard, in contrast to existing advertisements on e-card web sites, in some preferred embodiments, e-card regions are modified to include advertisements within the e-card region itself. By way of example, FIGS. 24(A) and 24(B) show screen shots of some combined e-ad/e-card embodiments with advertisements contained within or integrated with e-card regions.

Figure 24A:
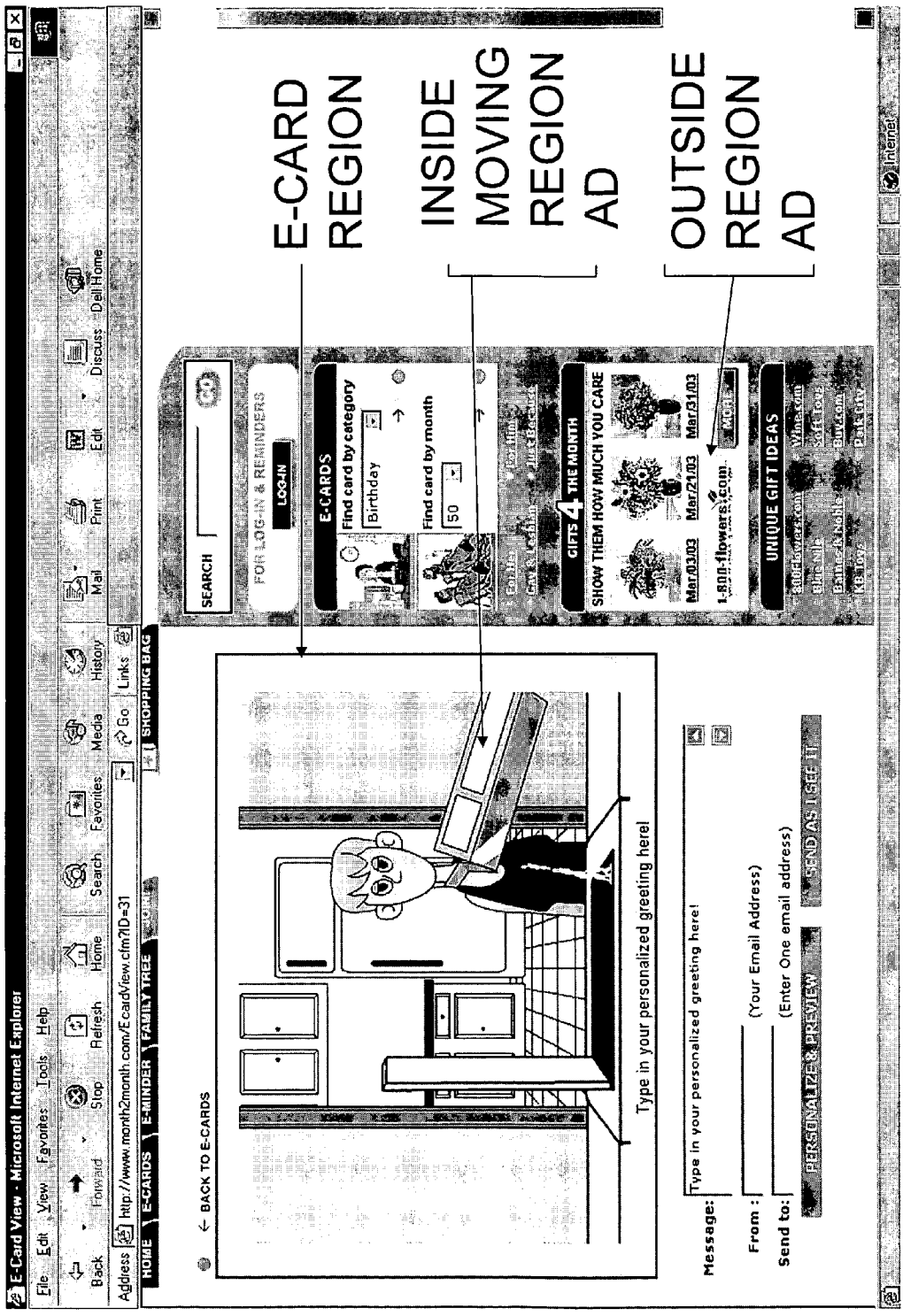
FIGS. 24(A) and 24(B) are screen shots showing some combined e-advertisement/e-card embodiments including advertisements contained within e-card regions.

FIG. 24(A) shows an illustrative screen shot that can be displayed on a user's computer. In the illustrative embodiment, an E-Card Region is shown at the left side of the screen. In preferred embodiments, the e-card displayed in an E-Card Region can be personalized by a user (i.e., an individual that sends the card to a desired recipient), such as, e.g., by typing in a text message (such as, e.g., depicted in the on-line form displayed beneath the E-Card Region shown in FIG. 24(A)). Upon entering text, the text can then be displayed automatically within the E-Card Region in place of the text shown reciting "Type in your personalized greeting here!"

Figure 24B:
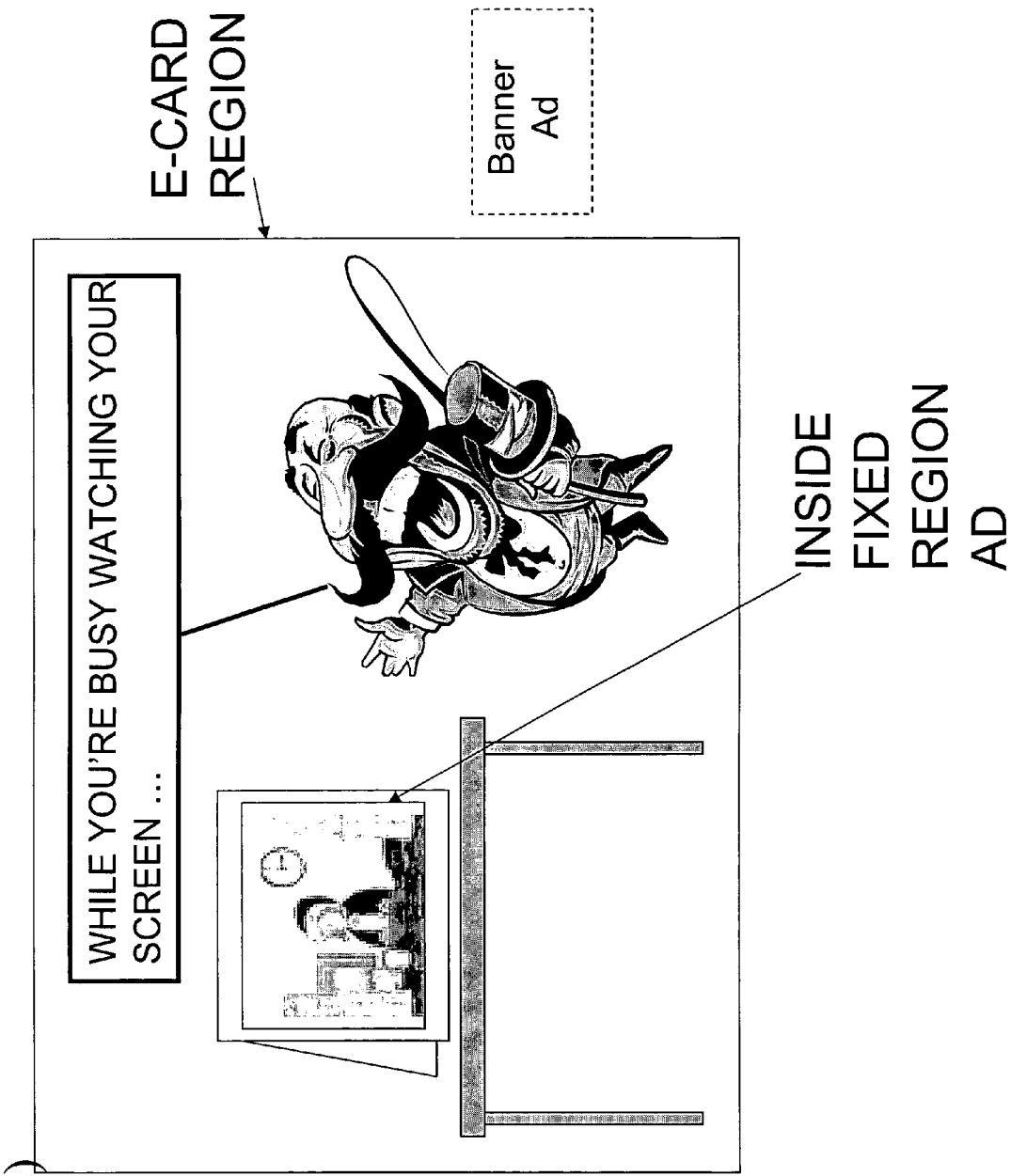
Figure 26:
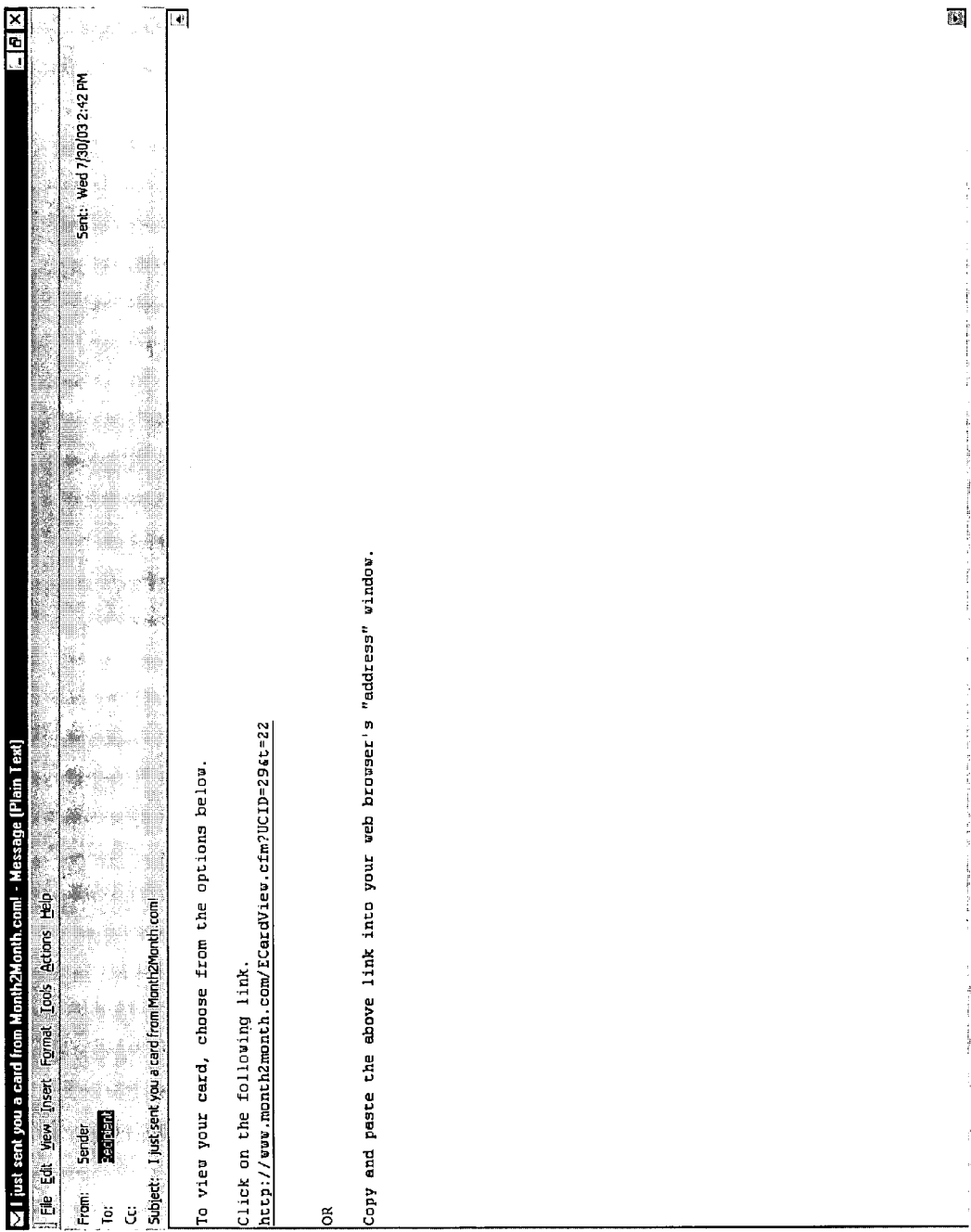
FIG. 26 is an illustrative e-mail that can be sent to a recipient in some illustrative embodiments providing them to a URL or link to an on-line network location to view their personalized greeting card.

In some embodiments, as depicted in both FIGS. 24(A) and 24(B), an advertisement region is spatially located within the E-Card Region. In the embodiment shown in FIG. 24(A), the advertisement region moves with respect to time so as to effectively be part of an animation of the e-card. For example, in the illustrative embodiment, a box of product (e.g., laundry detergent), includes one or more regions thereon for display of an advertisement (such as, e.g., a product name, information regarding a product or services, etc.). In some illustrative embodiments, an advertisement region is, thus, as shown by way of example in FIG. 24(A), located in the E-Card Region and adapted to move along with animation of the e-card.

In order to create the e-card with the advertisement region, in some preferred embodiments, an initial shell e-card can be created without a desired advertisement in the E-Card Region. Then, the e-card can be modified to include the desired advertisement. In some illustrative methodologies, a potential advertiser is shown the e-card without the advertiser's ad. Then, upon receipt of payment of the advertiser and/or upon establishing the content of the advertiser's ad, the advertisement region can be created and/or incorporated into the e-card. In some embodiments, software can be used to insert a single image advertisement within the e-card such that the single image advertisement is caused to be movably displayed along with the moving region ad. This can be done, e.g., by creating a plurality of images repositioned in accordance with the movement of the advertisement region and then combining the images with sequential images of the e-card.

Preferably, e-cards are created that have advertisements integrated into the card in such a manner to limit the obtrusiveness of the advertisements. For example, when advertisements are located in an outside region, such as, e.g., the Outside Region Ad for 1-800-flowers.com shown in FIG. 24(A), this advertisement can detract from the card and can limit the available space for the card on the user's display screen. While in the illustrative example, the 1-800-FLOWERS.COM advertisement could (by way of illustration) be an advertisement for an affiliate of the Web Site (e.g., a company's whose products are sold via the Web Site), use of outside region advertisements for companies that are not affiliated with the Web Site and/or that do not have analogous or related products or services could be particularly offensive to users or recipients. For example, this form of advertisement could limit the region of the card without any direct benefit to the recipient and/or sender relating to the e-card itself. Because cards are by their nature often supposed to have a personal and/or thoughtful quality, combining advertisements on cards in a manner that reduces the size of the card, detracts from the card and/or that is too intrusive and/or forceful can greatly reduce the benefits sought from the card itself (e.g., harming relationships between senders and recipients rather than helping such relationships).

FIG. 24(B) shows an embodiment in which a fixed region within the e-card is used for advertisement space. Here, a fixed region can include, e.g., a region fixed spatially with respect to the E-Card Region (such as, e.g., by way of orientation, size and position). In some embodiments, the fixed region could potentially move, such as, e.g., when a window or frame position on a computer monitor is repositioned, resized or otherwise moved, but such would, preferably, move in fixed relationship to the E-Card Region.

In some embodiments, the advertisement region could also include subject matter shown therein that is provided from another URL or another location on a network (e.g., supplied by another server). Most preferably, the ad region would include a region having some relationship to the illustrated content of the e-card, such as, e.g., a front of a computer screen in one illustrative example shown in FIG. 24(B). In the merely illustrative and non-limiting example shown in FIG. 24(B), the e-card includes a character that discusses computer screens while a computer screen (shown to the left of the character upon a table) displays an advertisement. While the Inside Fixed Region Ad within the illustrated computer screen shown in FIG. 24(B) is generally rectangular, it can have any desired shape. In some examples, it could even be a pictorial representation of a particular product, such as, a manufacturer's automobile (e.g., of ACURA or some other company), a manufacturer's cellular phone (e.g., of SANYO or some other company), etc.

In some preferred embodiments, the advertisement region can include embedded hyperlinks to another Web Site or URL related to the advertised product and/or to information that the advertiser wishes to direct users to. In some preferred embodiments, the advertisement region can be adapted such that upon clicking the advertisement region a pop-up advertisement is shown on the user's computer screen.

While FIGS. 24(A) and 24(B) depict visual advertisements incorporated into the e-card itself, other embodiments can include audio advertisements and/or audio portions of advertisements. For example, in embodiments where the e-card is displayed for a period of time, such as, e.g., where a video is shown, the advertisement can include an audio portion integrated with the e-card. For example, the e-card could potentially include background music that is a theme song for a product or the like.

In some preferred embodiments, the advertisement (whether audio and/or video) relates to products having a logical relationship to the e-card (such as, e.g., relating to a type of product shown in the e-card or the like).

In some embodiments, the e-card shown in the E-Card Region can include a fixed image (such as, e.g., a single picture or image). However, in preferred embodiments, the e-card shown in the E-Card Region includes a short video (such as, e.g., lasting over about 15 seconds and less than about 2 minutes, or more preferably, lasting over about 30 seconds and less than about 1½ minutes, or in some embodiments, lasting near or over about 1 minute). By way of example, the video could be created using MACROMEDIA FLASH, GIF animators (e.g., sequencing images), JPEG animators and/or the like. Any appropriate software for creating video representations on a computer can be employed in some embodiments, especially software usable with browser software executing on a client computer that is connected to a network such as the Internet. In some embodiments, images within e-cards can include illustration(s) (e.g., cartoons, animation, etc.) and/or photograph(s)(e.g., photographic images of real-life objects) and/or combinations thereof.

FIG. 25 is a flow diagram showing the creation of a combined e-ad/e-card in some illustrative embodiments. As shown, in some preferred embodiments, the electronic card and the electronic advertisement (or substantial portions thereof) are preferably created prior to the creation of the combined electronic advertisement and electronic card. In this manner, for example, a similar e-card can be readily adapted—as needed—to accommodate various advertisements (e.g., changing particular advertisements and/or particular advertisers and/or enabling different advertisers to use a similar card). Moreover, in this manner, a like advertisement can be readily adapted—as needed—to be incorporated into a variety of e-cards.

Other Modifications and Embodiments

1. Export/Import Family Tree Information Embodiments

In some illustrative embodiments, as described above, a user can create one or more family tree. Then, the information entered into the system (stored, e.g., in a relational database or the like) can be exported, imported, uploaded, accessed and/or the like to help create another displayed family tree. In some embodiments, this other family tree can be another family tree of that same user. In some embodiments, this other family tree can be another family tree of one or more other user(s).

Figure 27:
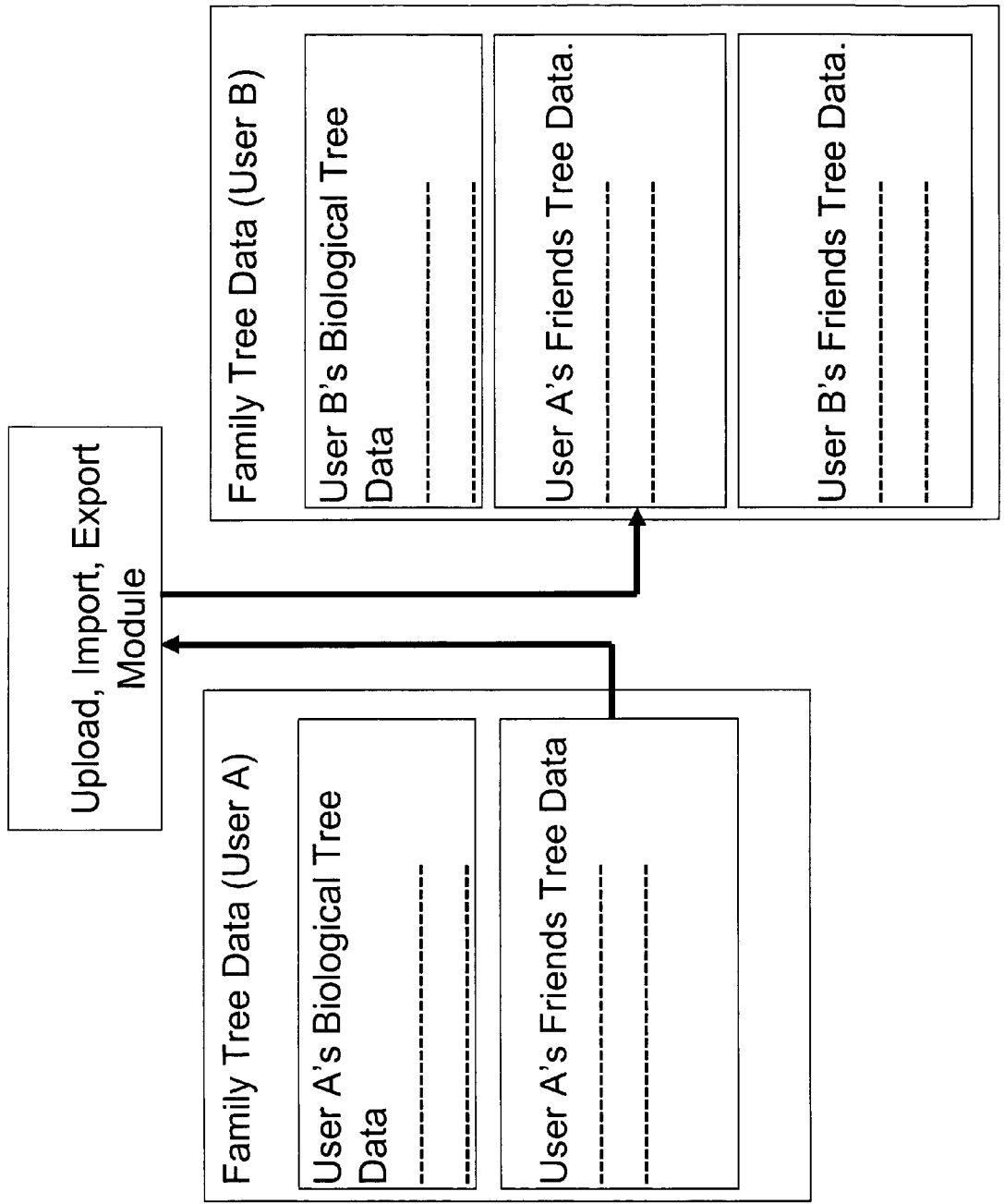
FIG. 27 is a schematic diagram depicting exportation or the like of family tree data according to some illustrative embodiments.

By way of example, FIG. 27 demonstrates the use of a module for uploading, exporting and/or importing family tree data from family tree data storage of User A to a family tree data storage area of a User B. While FIG. 27 shows an illustrative example in which data for the family tree of Users A and B may be in separate data locations, it is contemplated that any form of data storage can be used in various embodiments. By way of example, data for a plurality of users, such as, e.g., including Users A and B, can be stored in a common database, such as, e.g., a relational database.

In some embodiments, in order to enable exportation, uploading, importation or access of data, a first user whose data may be desired by another user must enable or set permissioning to enable such exportation and/or the like of data. For example, in some embodiments, a family tree Web Page, such as, e.g., shown in FIG. 15 may include an icon, menu, hyperlink or the like upon which the user can click in order to allow or enable such exportation. In some embodiments, the user can enable all of the individuals within their family tree to export or the like such data collectively, individually, in sub-sets of individuals and/or the like. In some embodiments, passwords, User IDs, exchange keys and/or the like can be used to enable certain permissioned users to export or the like such data. For instance, in some embodiments, the user can be given a code that can be forwarded to other members in his family tree to enable them to export information. Notably, in some more preferred embodiments, permissioning is not limited to other users listed in a user's family tree, but may extend to any other permissioned user.

In some embodiments, users can also enable their information to be made publicly available to some limited extent. For example, in some embodiments, a user may enable information in his or her family tree to be exported or the like to other users that enter a sufficient amount of information to identify one or more individual (such as, e.g., by name, address and/or other identifying information).

2. Engine for Display of Historical Data

Figure 28:
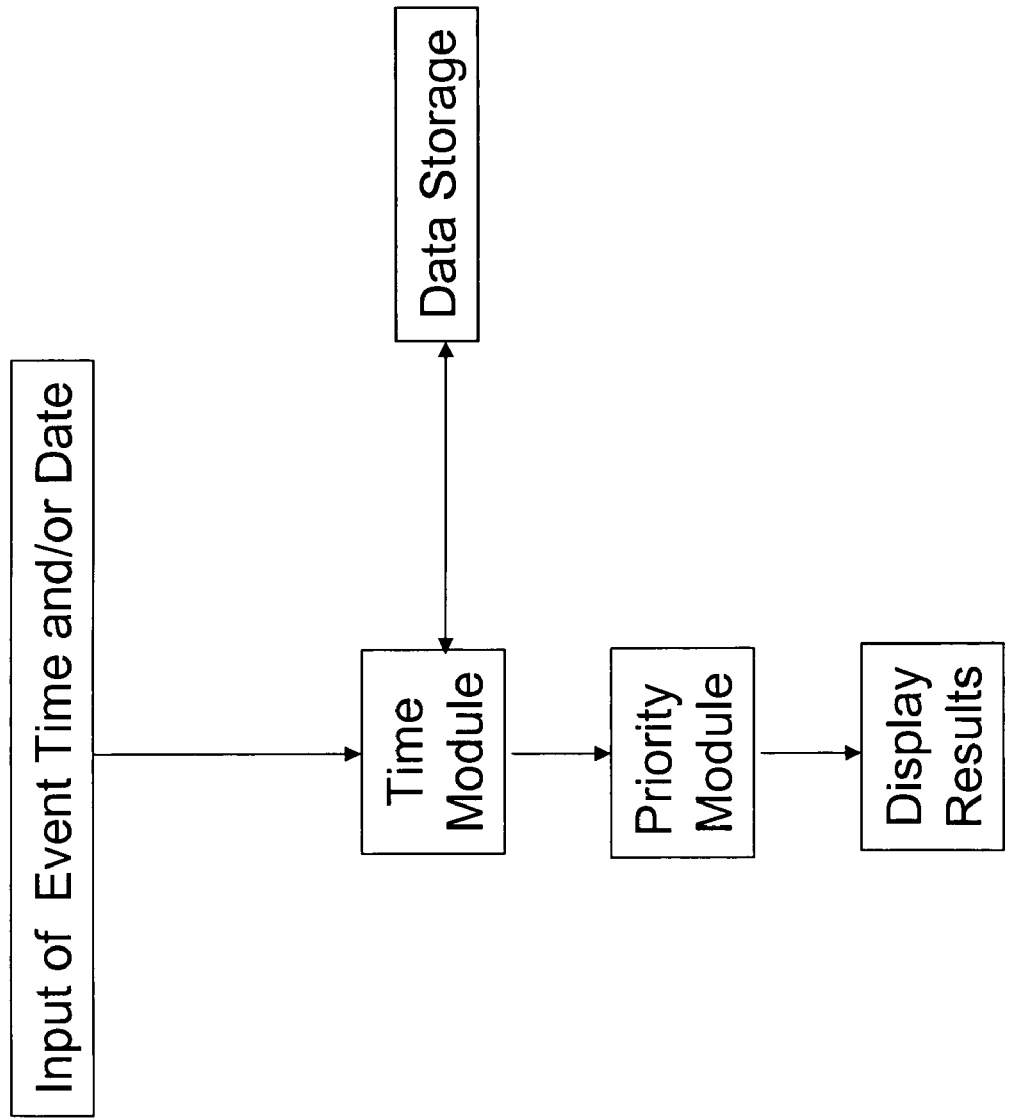
FIG. 28 is a schematic diagram depicting determination and display of historical information according to some illustrative embodiments.

In some embodiments, as shown, e.g., in FIG. 11, historical data can be displayed using a novel engine or module for display of historical data. In this regard, if, for example, trivia information is desired to be presented to a user, such an engine or module can be employed. By way of example, FIG. 28 shows an illustrative flow diagram that can be employed with the use of such an engine. In this regard, at a first step, a time and/or date can be input into the system. In some embodiments, this time and/or date could be user selected (such as, e.g., having a user enter a particular time and/or date, such as, e.g., a date of birth, a wedding date and/or the like). In some embodiments, this time and/or date could be computer generated. For instance, in some embodiments, this time and/or date could be the present time and/or date which may be determined via an electronic clock or timer. In a second step, as shown, the engine uses a time module that calculates comparative time values based on the input time and/or date. For example, these comparative time values may be used to identify information in data storage or the like. For example, a database may contain celebrity birthday information for about 2000 celebrities. The engine can be used to identify celebrities having birthdays with comparative time values to the input time and/or date. For example, the engine could be used to identify celebrities sharing a monthly birthday with an individual, to identify celebrities having particular monthly birthdays (e.g., 100 month birthdays, such as, e.g., 100, 200, 300 . . . 900 month birthdays) and/or the like at a given time.

In a third step, as shown, the engine can include a priority module that isolates information using a pre-determined priority scheme, such as, e.g., to limit the displayed results to a displayable number of celebrities (such as, e.g., about 5 in some examples), to limit the displayed results to information not recently displayed, to prioritize the displayed results to show information in a certain order, such as, e.g., 500 month birthdays and/or the like.

In some preferred embodiments, a user can select the input value for the time and/or date, such as, e.g., by inputting an individual's date of birth. In some embodiments, a user can even select a particular set of comparative time values to evaluate in the time module, such as, e.g., by designating monthly birthdates (or, daily, weekly and/or the like birthdays for example) and/or other information regarding the results desired to be calculated. In some embodiments, the system enables a user to save the calculated information and to provide and/or forward the same to another individual (such as, e.g., in some embodiments, the recipient of an e-card or the like).

3. Assorted Methods of Delivery

In various embodiments of the invention, the manner in which e-cards or the like are delivered or provided to a recipient can vary as long as the e-card or the like can be created at a user location or computer and viewed or observed at a separated recipient location or computer. By way of example, the e-card can be delivered by sending a file, such as, e.g., an .exe file or the like via e-mail and/or other means to a recipient's computer (e.g., a desktop computer, a laptop computer, a PDA and/or any other appropriate electronic device capable of processing information and sending and receiving communication signals), or by forwarding a hyperlink, a URL and/or the like to a recipient so that the recipient can use the same to access the e-card, such as, e.g., using browser software. Thus, any means to enable a personalized e-card region to be displayed upon a recipient's computer can be employed to deliver or provide e-cards to recipients.

4. Other Advertisement Embodiments

As described above with reference to, e.g., FIGS. 24(A), 24(B) and 25, in some preferred embodiments, advertisements can be added to e-cards and/or other e-communications in a unique manner, providing substantial advantages over prior methods of presenting advertisements to potential consumers.

A. Hyperlinks and Banner Ads

In some other embodiments, the advertisements within the e-card regions can include a hyperlinks, embedded URLs and/or the like upon which a user can point, click and/or the like to be directed to and/or access further information (such as, e.g., related to the advertised product, merchandise, services and/or the like). Additionally, as shown in dashed lines in FIG. 24(B), in some embodiments, a banner ad can be included. In some examples, such as shown, the banner ad could be located outside and adjacent the e-card region. In other examples, the banner ad could be located fully or partly within the e-card region. Preferably, the banner ad can similarly include, e.g., hyperlinks, embedded URLs and/or the like upon which a user can point, click and/or the like to be directed to and/or access further information (such as, e.g., related to the advertised product, merchandise, services and/ or the like). While providing banner ads in a region outside of the e-card region can have some negative impact on consumer satisfaction, etc., in some embodiments, such banner ads can be advantageous. For example, by combining internal (i.e., inside the e-card region) advertisements along with external (i.e., outside the e-card region) advertisements, the marketing impact can be greatly enhanced.

Additionally, by incorporating an advertisement within an internal region that is intended to be purposefully and directly viewed by the user (i.e., inside the subject matter viewed), the user is likely to both a) see the advertisement and b) not be annoyed or distracted by the advertisement since it is within the subject matter being focused upon. In contrast, advertisements that are external to the subject matter viewed tend to clutter one's computer display and/or to annoy or distract the user from their intended focus (e.g., their visual field of view is disrupted and/or the like). Notably, many existing advertisements in Web Pages or the like include moving elements, such as, e.g., causing a banner ad to shake, causing the coloring and/or images to change over time, etc., in fields outside of the user's intended field of focus. This eye-catching movement can be very distracting and annoying to a user. On the other hand, in some preferred embodiments herein, advertisements can be substantially seamlessly incorporated into e-cards or the like in such a manner as to a) catch a users focus and attention without distraction by being integrated into the content being viewed or the like, b) catch a users focus and attention by movement of the advertisement without distraction due to such integration.

Additionally, in some instances, an e-card may change over time (such as, e.g., if it has a generally video like format) or have a limited duration. Accordingly, merely embedding an advertisement within the displayed e-card may be less desirable since it may cause frustration to a user that may wish to actually view the advertisement in the event that the advertisement is removed from view. Accordingly, having a banner ad or other ad concurrently located adjacent the e-card can be advantageous. Among other things, such a banner ad or the like can enable a user to click on the advertisement at any desired time (either during display of the e-card, after display of the e-card, during display of a portion of the e-card with an integrated advertisement and/or the like).

B. Preferred Subject Matter of Advertisement i) Advertisement Independent from E-Card Service Provider In some most preferred embodiments, the advertisement relates to one or more of a product, a service, an entity and/or other subject matter, which is independent from the e-card service provider. By way of example, in some preferred embodiments, such advertisements could, in fact, be sold by the e-card service provider to other entities as a means of receiving finances by the e-card service provider. Illustrative other entities can include, for example, retailers, airline or travel companies, restaurants, service providers, professional services, etc.

ii) Advertisement Secondary to Purpose of E-Card

In some most preferred embodiments, the advertisement relates to subject-matter that is secondary to the purpose of the e-card. For example, in some embodiments, the purpose of the e-card may involve, e.g., the celebration or acknowledgment of a time-based event, such as, e.g., an individual-centric event, such as, e.g., a birthday, an anniversary, a holiday (such as, e.g., mother's day, father's day, valentine's day, etc.), and/or the like. In some embodiments, for example, the sender of the e-card may identify the purpose of the e-card by locating the e-card in a particular category of e-cards, such as, e.g., in a listing of available birthday cards, anniversary cards, and/or the like.

iii) Advertisement Includes Image of Product Contained within E-Card

In some embodiments, the advertisement can involve an image of a product shown in the e-card and incorporated as subject matter within the content of the e-card (i.e., not independent from the subject matter of the e-card). In some embodiments, the image of the product can be an artistic representation of the product. In some embodiments, the image of the product can include a real photograph (or real video) of the product. In some embodiments, the image of the product includes a real photograph or video while the remainder of the e-card is substantially artistically created (e.g., drawn, painted, created using computer graphics and/or the like) or vise versa. In that manner, the advertisement may stand out more notably from the e-card.

Figure 29:
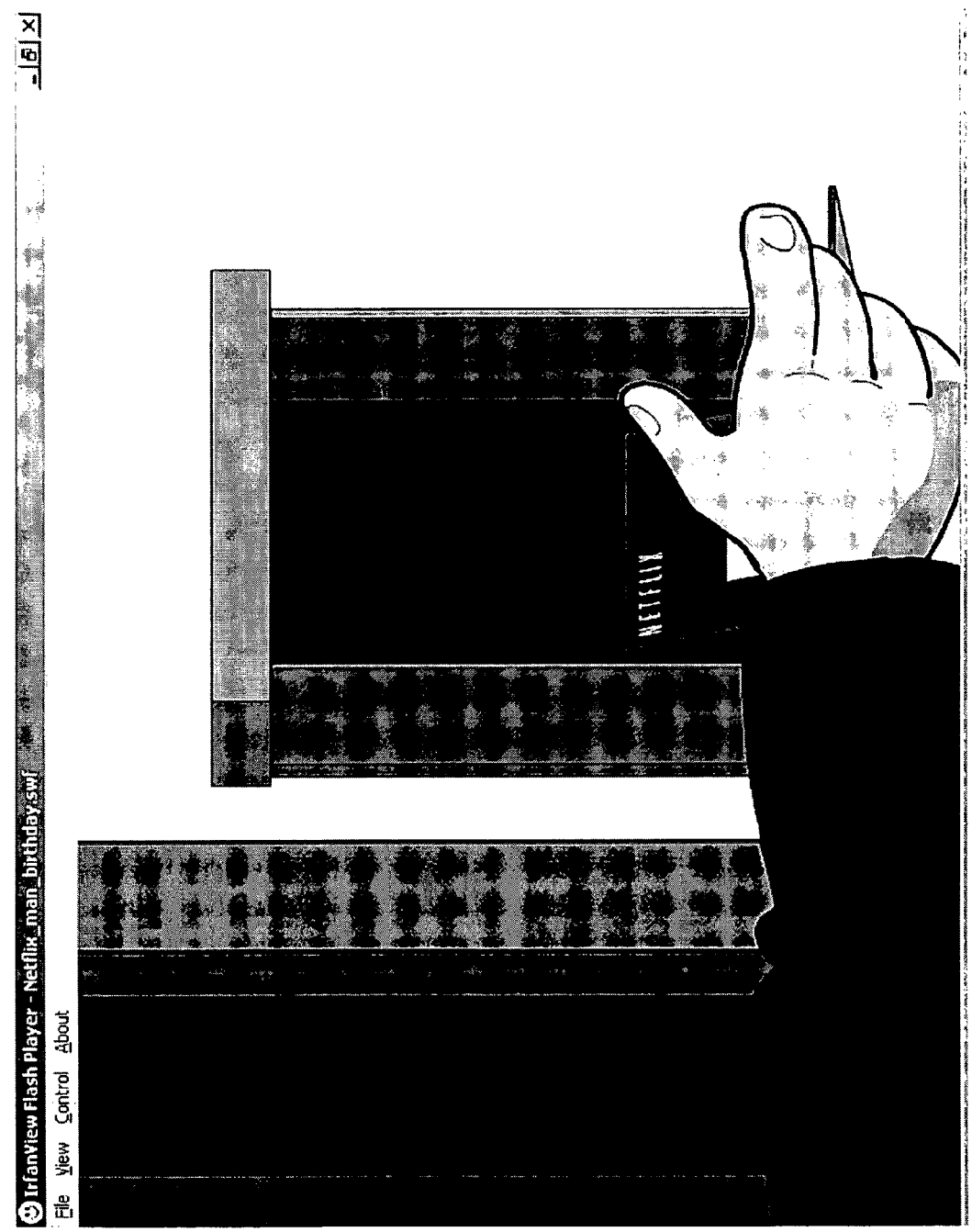
FIG. 29 is an illustrative screen shot depicting an advertisement embedded within an electronic card display image.
Figure 30:
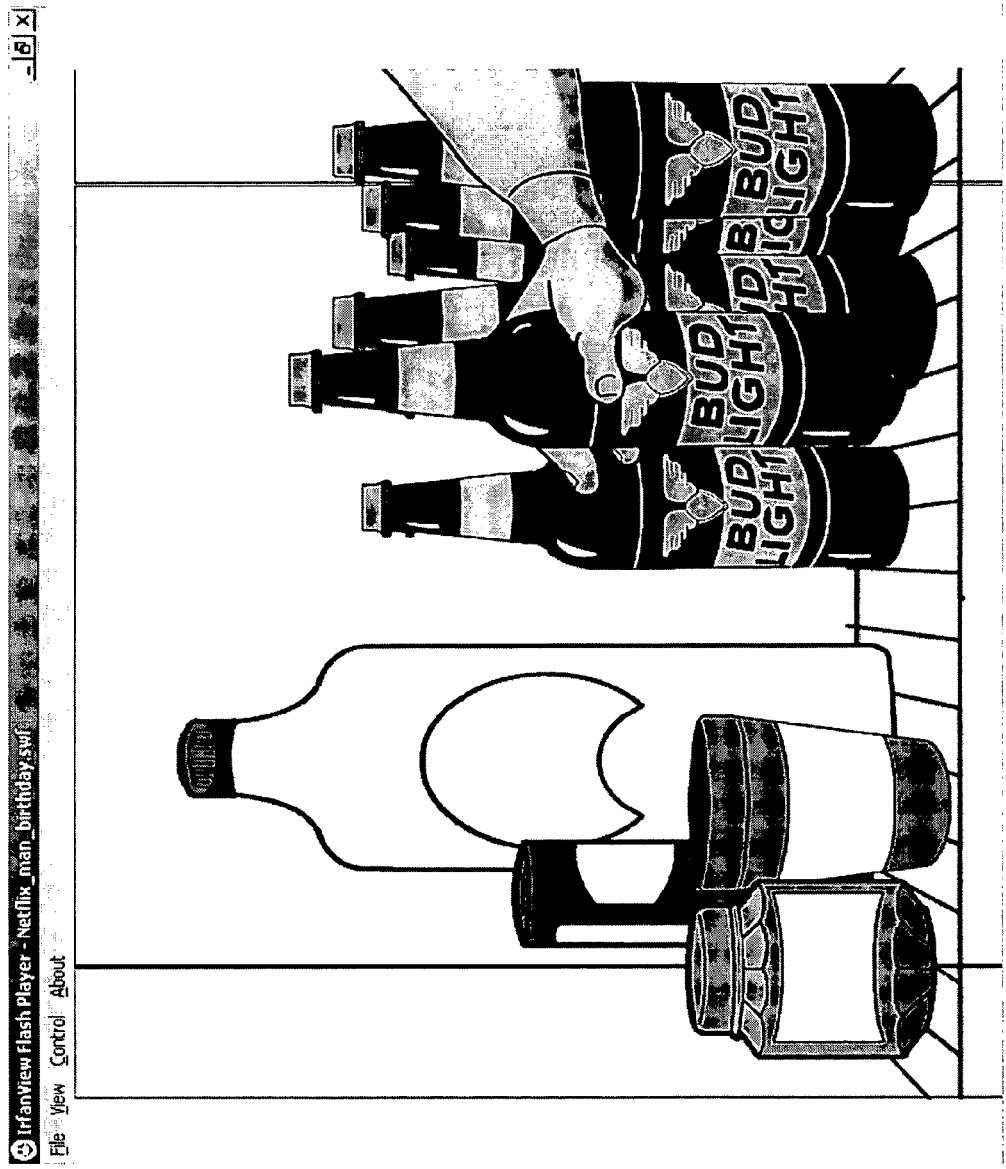
FIG. 30 is another illustrative screen shot depicting another advertisement embedded within an electronic card display image.

FIGS. 29 and 30 show some illustrative screen shots of e-cards including images of products which are integrated into the e-cards (in these examples, integrated into a video e-card). Here, FIG. 29 would be useful to essentially provide a subtle advertisement for a company called NETFLIX by showing a NETFLIX logo on a product handled by the cartoon-drawn person illustrated in the figure. Similar, FIG. 30 would essentially provide a subtle advertisement for, as one example, BUDLITE beer handled by the cartoon-drawn person illustrated in the figure. It should be noted that any number of advertisements can be included into a single e-card. Preferably, however, the subject matter of the advertisement(s) should each have some logical relation to the purpose of the card, such as, e.g., wherein a product image is used essentially as an active prop (i.e., actively used in the e-card) and/or as a passive prop (i.e., passively present in the e-card).

C. Preferred Payment Methods i) User Payment Methods

In some embodiments, users of the e-card service may be charged fees for usage. For example, a user could be charged a) periodically (e.g., for a particular time period of use) and/or b) on a usage basis, such as, e.g., on a per-card basis (e.g., to purchase a particular card to send). Preferably, payments are made by the user by providing an on-line means to render payments via their client computer (e.g., on-line) using any known on-line payment methods, such as, e.g., by way of example, via a credit card, a virtual wallets, via an e-certificate, via one or more system such as PAYPAL.COM and/or any other payment methods.

In some embodiments, users could potentially be required to render a payment to deliver e-cards or the like without the inclusion of advertisements, but could receive a discount or have no payment requirement upon the inclusion of an advertisement in their e-cards or the like (discussed further below).

ii) Advertiser Payment Methods

In some embodiments, the users of the e-card services are charged a nominal fee for usage and/or no fee for usage. Preferably, the e-card service provider receives revenues through advertisement sales. For example, advertisers are preferably charged advertisement fees. In some embodiments, payments are made by the advertiser by providing an on-line means to render payments via their own computer (e.g., on-line) using any known on-line payment methods, such as, e.g., by way of example, via credit card, virtual wallets, e-certificates, systems such as PAYPAL.COM and/or any other payment methods.

Similar to charges to users in the above user payment method examples, an advertiser could similarly be charged a) periodically (e.g., for a particular time period of use) and/or b) on a usage basis, such as, e.g., a per-card basis (e.g., to purchase a particular card to send).

In some embodiments, advertisers can be charged on a per-card basis by, e.g., charging a fee after a card with their advertisement is a) sent to a recipient, b) selected for sending to a recipient, c) acknowledged as received or confirmed received by a recipient (such as, e.g., by an automatic reply e-mail, by a recipient's accessing of the e-card service provider site via a link provided during display of the e-card with the advertisement and/or the like), d) and/or the like.

iii) User Information Data

In some preferred embodiments, a database or the like can be created containing compiled information related to users. By way of example, in preferred embodiments, information related to users that specifically identify or select the e-card to be delivered can readily be stored into a database, data storage or the like. For example, upon the sending of an e-card to a recipient, the user's information can be stored in a database, a data storage file or the like. In this regard, users can be required to, e.g., register for site usage by inputting information, such as, e.g., the user's name, address, telephone number, e-mail address, other personal information (such as, e.g., their age, marital status, employment, income, credit card information, etc.), which information could be used to provide advertisers with a highly concentrated list of users that specifically show some interest in their products, services or the like by way of their selection of the advertiser's e-card or the like out of a multitude of other possible selections. In some embodiments, information regarding the recipient of such e-cards can similarly be stored. In this latter case, recipient information may be entered by the users (including, e.g., name and e-mail information to facilitate "delivery" of e-cards in some cases), by the recipient's themselves (e.g., in some instances after receipt, the recipient may access the e-card provider site and either a) render a purchase, b) sign up as another user, c) enter personal information based on a consumer questionnaire request form and/or the like.

In some embodiments, fees to users (e.g., senders of e-cards) can be waived or reduced upon the user's completion of a user registration submitting desired user information. In some embodiments, fees to advertisers can be charged based upon the user information provided to the advertiser (such as, e.g., based on a volume of user information provided).

In some embodiments, advertiser fees can be calculated based on volume of user information provided and/or based on, e.g., fees determined as discussed in the preceding section, and such calculated fees can be incorporated into periodic (e.g., monthly) billing statements to advertisers. In this manner, advertisers would preferably not be charged for incremental costs, but charges would be aggregated into a single or periodic bill or statement.

In some embodiments, advertisers could additionally and/or alternatively be charged based on a) the number of advertisements available to users out of the total number of e-cards available (e.g., the number of e-cards available with their advertisement), b) the location of their advertisements offered or the location of their e-cards offered, c) and/or the like. For example, advertisers could be charged, in some cases, a periodic (e.g., monthly) rate for a certain number of advertisements or e-cards with their advertisements, for placement positions of their advertisements or e-cards with advertisements (such as, e.g., by having their advertisements or e-cards with advertisements on one of a select group of "favorite or preferred cards" identified by the e-card service provider to users or the like, having their advertisements or e-cards directly accessed or linked from an e-card service provider Web Site home page and/or the like).

iv) Payments to Users

In some preferred embodiments, users may also receive payments for their use of the Web Site or the like user interface. By way of example, a user might receive a payment on a usage basis (such as, e.g., upon the delivery of an e-card with a particular advertisement of an advertiser, upon the confirmation of receipt of such an advertisement by a recipient or the recipient's computer system, upon the purchase of a product or service of the advertiser by the recipient and/or the like). In some embodiments, payments to users can be made via the e-card service provider and/or via the advertisers themselves based on information acquired by the e-card service provider. In some embodiments, payments can be a nominal amount for the mere sending of an advertisement to a recipient (such as, e.g., a fraction of a cent or a few cents for each e-card with an e-ad delivered) and/or can be a significant amount in the event that a recipient and/or the user makes a purchase of the advertiser's products or services (e.g., within a particular time period or the like). In this manner, users can receive a substantial incentive to distribute e-cards or the like with e-advertisements.

v) Anti-Spam Features and Benefits

With the implementation of various embodiments in which users select and send advertisements to recipients directly, advertisers may receive various anti-spam advantages. By way of example, advertisers may potentially avoid some anti-spam legal issues by virtue of the user's selection and sending of e-cards to recipients. First, the user selection may help shield advertisers since advertisers would not control such actions. Second, the user selection would likely result in diminished spam concern since users would essentially be sending e-cards or the like to their friends, acquaintances and/or the like. Third, in some embodiments, the users would preferably not merely be contacting the recipient for the purpose of an unsolicited advertisement, but for other purposes (such as, e.g., a main purpose of an e-card, such as, e.g., to celebrate the recipient with a birthday greeting or the like).

vi) Application to Various E-Communications (i.e., E-Cards and Beyond)

The methodologies described in various embodiments herein do not have to be limited to implementations within e-card environments, but can be, as should be understood based on this disclosure, incorporated into any other form of e-communications. As some examples, an advertisement scheme could be established whereby advertisers do not directly send advertisements to recipients, but whereby advertisers send advertisements to recipients via other individuals. In such cases, the other individuals do not necessarily need to be senders of e-cards. By way of example, the other individuals could merely be sending advertisements alone in some embodiments, or could be sending another form of e-communication (such as, e.g., an e-mail which includes a user selected advertisement, an e-invitation or e-vite to a party or event, and/or the like). In such cases, users can potentially receive payments for usage and/or the like similar to that detailed above (such as, e.g., payments for merely sending advertisements, payments upon purchase of products, etc., as discussed above). Moreover, in this manner, advertisers can more readily address anti-spam problems (such as, e.g., anti-spam laws, laws placing individuals on anti-spam lists, recipient protocols limiting e-mails or the like to that coming from approved lists, etc.).

Additionally, by appending user selected advertisements to user communications, the advantages of highly pertinent advertising with substantially reduced consumer annoyance can be readily achieved. In fact, because the advertisements selected by users would be user-selected, the incorporation of user-selected advertisements into e-communications, such as, e.g., e-cards, e-vites (the definition of which, as would be understood by those in the art, overlaps with e-cards), e-mails and/or the like can also provide new advantages not previously possible. That is, the inclusion of advertisements can actually provide new advantages to users and to recipients. This should make the user and/or recipient more than happy to receive such advertisements. For example, by appending advertisements to a communication, the user can select advertisements that may be relevant to a particular need and/or to the subject matter of the communication delivered. For example, a wife could send an e-mail to her husband along with an advertisement for diapers and/or baby wipes, either a) based on a knowledge that her husband needs to purchase such items or b) based on relevance of the particular items to the subject matter of the communication (such as, e.g., in an e-mail stating "Honey, don't forget to purchase diapers on your way home."). In this illustrative case, the husband may be more than happy to view the advertisement. Moreover, despite receiving a clear benefit by such an incorporated advertisement, the husband and/or wife could further receive a benefit by way of receiving a financial reward for the use of this advertising methodology in some embodiments (e.g., see above section entitled Payments to Users). As another example, an e-vite could be delivered to one or more recipient along with one or more advertisement that may facilitate efforts by the invitee(s): for example, if a user sends an e-vite to a plurality of invitees to a dinner gathering, the user can include advertisements related to food products, such as, e.g., beer, wine, cheese, crackers and/or the like that invitees may bring to the party; as another example, if a user sends an e-vite to a plurality of invitees (such as, e.g., to invitees to a wedding, birthday or the like), then the e-vite may include advertisements related to relevant products, such as, e.g., TOYS R' US or the like for a child's birthday party, MACYS, CRATE & BARREL or the like for a wedding or the like, etc. Moreover, e-vites could also include advertisements related to a particular advertiser at which an individual or group of individuals (e.g., bride and groom) are registered for specific gifts, may include advertisements for specifically registered gifts and/or might include links to registry information.

Thus, some embodiments of the present invention can help to avoid spam related problems while providing a win-win situation for advertisers and consumers. After all, consumers have a need for advertiser products, just not for each and every advertiser product, such that user selection of advertisements can have substantial advantages. In some embodiments, a Web Site or the like could be provided from which a variety of advertisements could be selected. Preferably, advertisements would be searchable by category, key words, classification and/or the like in order to help users identify a desired advertisement. In some embodiments, a user could cut and paste an advertisement into their own e-mails created in another system (such as, e.g., MICROSOFT OUTLOOK or the like, which may, e.g., be located external to the advertisement creation Web Site or can be co-located on their computer or on their network or LAN or the like). In some embodiments, the Web Site or the like could include its own e-mail or e-communication mechanisms (such as, e.g., similar to some e-card Web Sites, to some e-mail offering Web Sites, such as, e.g., YAHOO.COM, HOTMAIL.COM and/or the like).

5. User Defined, Modified and/or Personalized E-Cards and/or the Like

In some embodiments, an e-card service provider can provide features to enable users to create user defined, modified and/or personalized e-cards, e-vites, e-mail advertisements and/or the like.

In some preferred embodiments, one or more of the following features can be made available to users to help them to define, modify and/or personalize an e-card, e-vite and/or the like:

A. An Image or File Upload feature can be provided whereby users can upload images (such as, e.g., photographs, etc.), audio files (such as, e.g., personalized verbal communications, statements or the like) and/or the like can be uploaded and incorporated into an e-card, e-vite and/or the like.

B. An Advertisement Modification feature can be provided whereby users can modify or adjust advertisements. Preferably, such modification would be within predetermined parameters established by the advertiser, such as, e.g., by enabling users to select from one or more colors, to enable users to select from one or more images, to enable users to select from one or more logos, slogans and/or the like of the advertiser, to enable users to insert their own messages within a portion of the advertisement, to enable users to modify the size of the advertisement, etc., based on user selection. In some embodiments, the fees charged to a user (i.e., if they receive bills for use of a system) or the payments made to a user (i.e., if they receive payments for inclusion of advertisements) can be varied based upon values selected for such advertisements. For example, a user that wishes to have a small and less-intrusive advertisement may select features with less size, less brightness, etc. In such cases, the financial reward to the user may be set at a lower rate.

C. A Text Modification feature wherein, in some embodiments, users can also modify other features of the e-card, e-vite or the like, such as, e.g., text desired and/or the like.

Figure 31A:
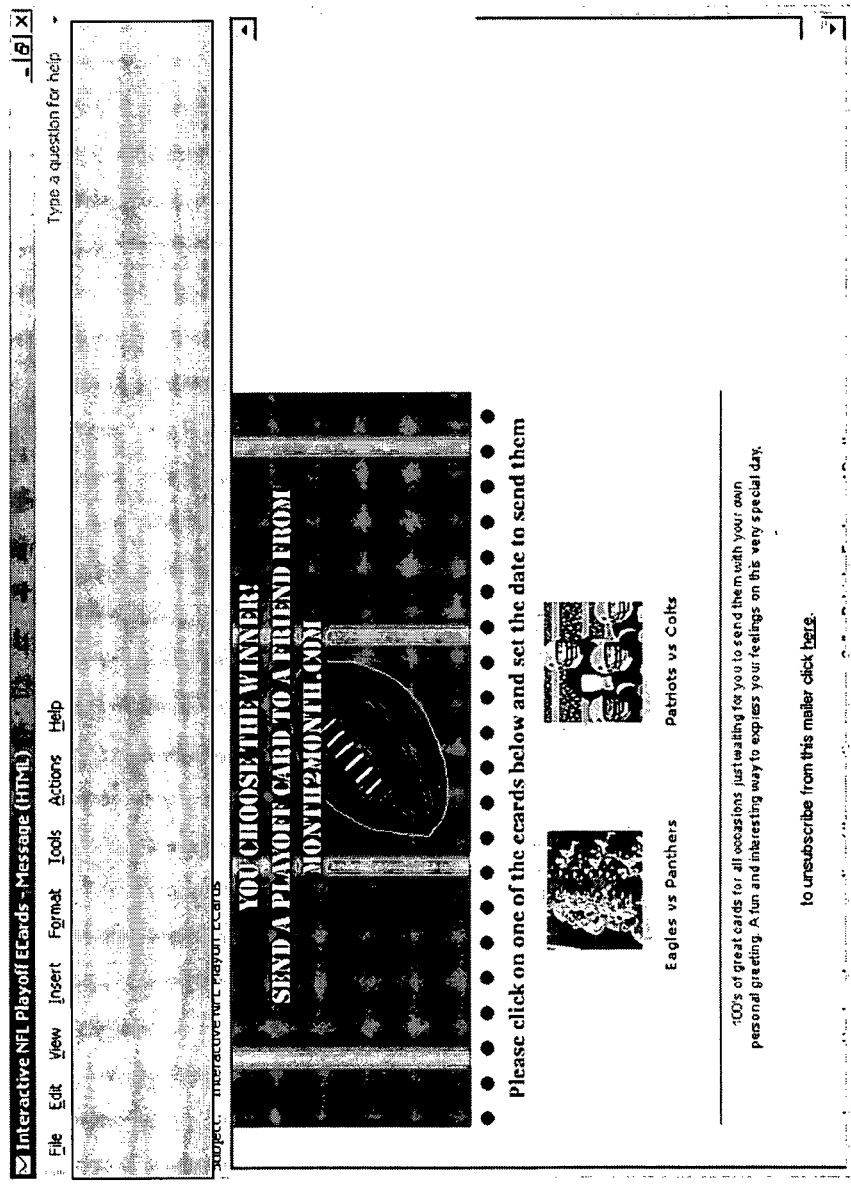
FIGS. 31(A)-31(D) show other illustrative screen shots of an illustrative interactive, user defined electronic card according to other embodiments of the invention.
Figure 31C:
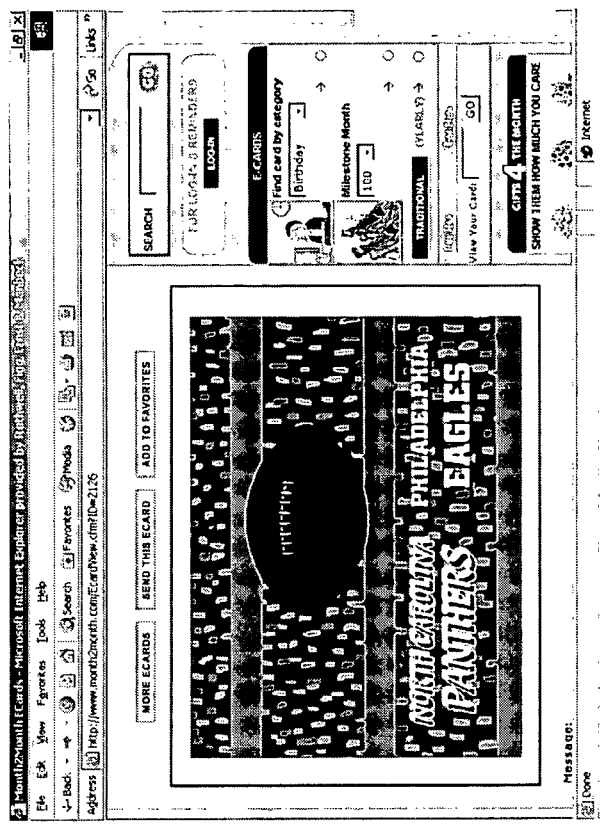
Figure 31B:
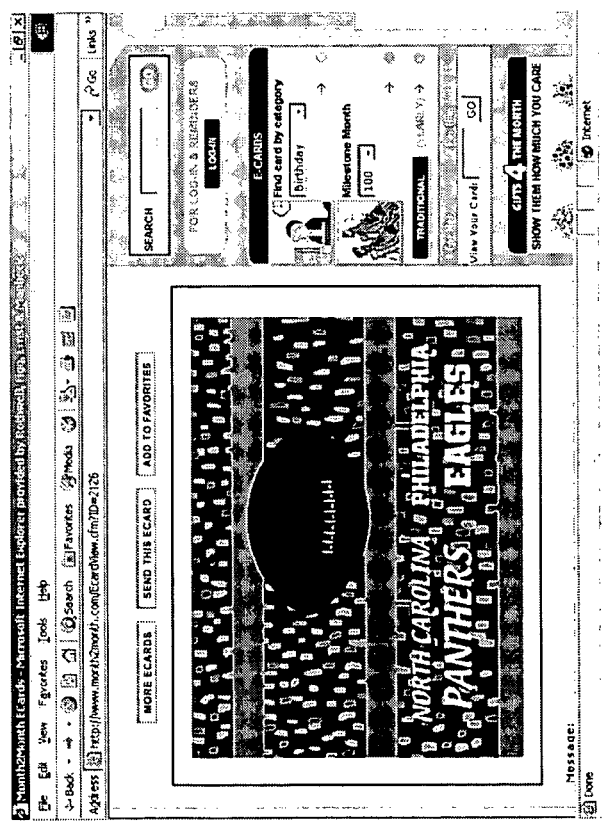
Figure 31D:
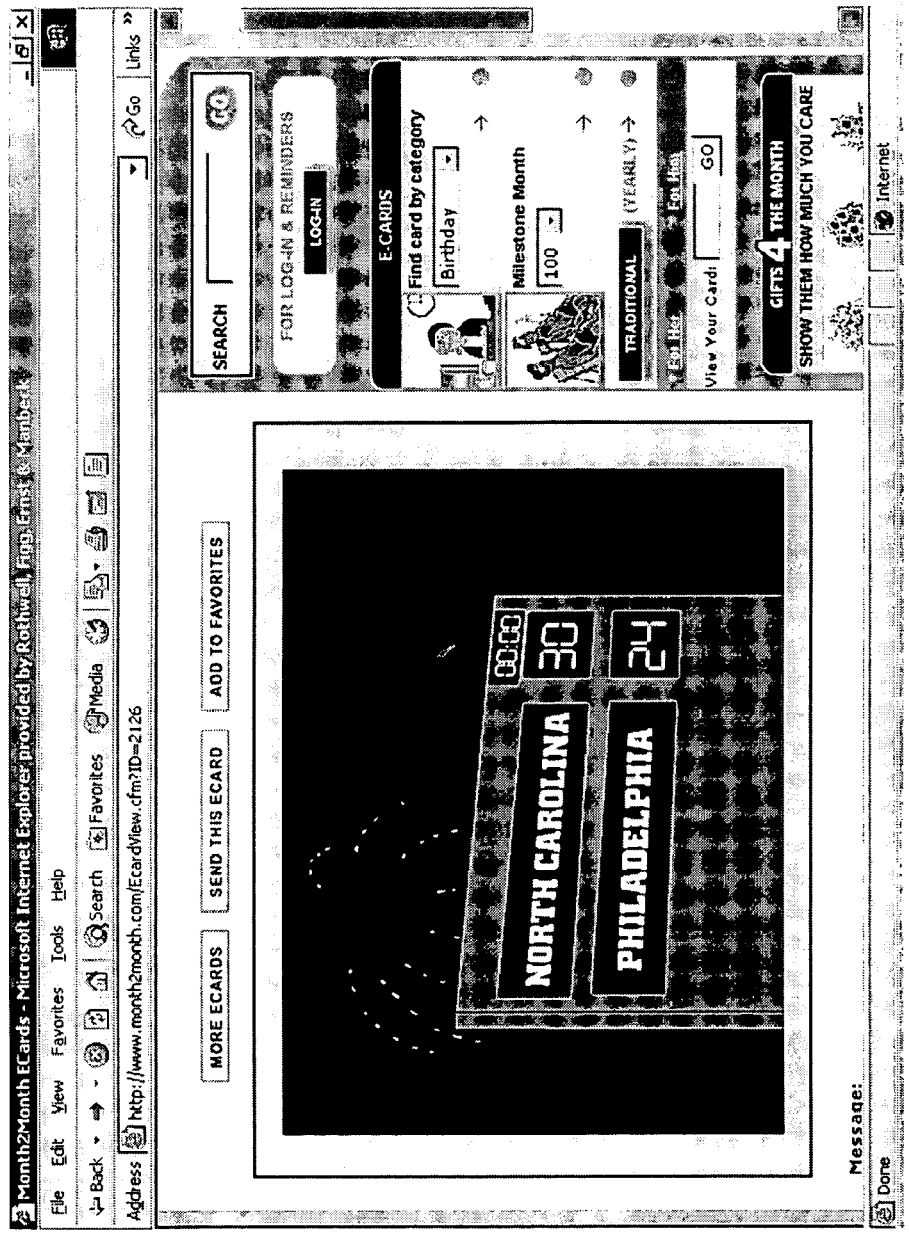

In addition, in some embodiments, an e-card, e-vite, e-ad or the like can be modified based on a user's "interactive" selection of material. For example, FIGS. 31(A)-(D) demonstrate one illustrative embodiment in which content of an e-card can be selected based on an interactive user selection. In this particular example, the e-card includes a video in which two sports teams are to compete in a future event. The user is instructed to select the desired team to win on one or more cards as shown in FIG. 31(A). Upon rendering such a selection, such as, e.g., shown in FIGS. 31(B) and 31(C)(in this example, the PANTHERS team is selected by a user clicking thereon as illustrated by highlighted lettering), the system can alter the e-card, such that the presented video will have a desired conclusion such as, e.g., in this example shown at FIG. 31(D) with the PANTHERS having won.

In addition to demonstrating an interactive feature, FIGS. 31(A)-31(D) also demonstrate another novel feature that can be employed in some preferred embodiments in which an e-card is delivered that is related to a future event. Here, in this example, the e-card is specially designed so as to send a user-selected hypothesis or guess regarding the potential or desired outcome of such a future event. In this manner, an exciting new way of communicating about up and coming events can be created, enhancing a user's enjoyment and experiences related to such an event. As with other embodiments, a user could also incorporate advertisements within such an e-card and/or advertisers could potentially provide e-cards related to their own future events, such as, e.g., sporting events, theatrical events, lottery events, sales events at stores and/or the like.

6. Other Calculator Features

In addition to calculations as described above which can be performed in some preferred embodiments, other embodiments could include one or more of a variety of calculations.

In some embodiments, calculations could be provided so as to demonstrate correlations between specific dates and/or times and other information or trivia. For example, in some embodiments, a calculator module can be used to display celebrities sharing a user's birthday and/or the like based on a user input of a particular birthday or the like. In this regard, shared birthdays could be based on months, weeks, days, years and/or the like. In some embodiments, in addition to input of a specific date, such as, e.g., a date of birth, a user can select and/or alter the comparison being rendered. In this manner, the user can essentially play with the system to learn interesting facts about themselves and/or other individuals. For instance, the system may be used to output that "on X date you will share a 100th birthday with President Bush." The specific 100 value may vary in some cases, such as, e.g., where a celebrity is celebrating 800 months, and an inputted user is celebrating 500 months or the like. In other embodiments, the system could be used to correlate a date and/or time at which two inputted individuals will share a birthday (such as, e.g., a monthly, weekly, and/or other birthday), such as, e.g., by inputting two or more corresponding birthdays (such as, e.g., of two family members) and having the system calculate a shared birthday and to display the same. In some embodiments, rather than inputting both or all values, the user can merely input the name of an individual (such as, e.g., if that individual's information is contained in a user's personal data [such as, e.g., their family tree] and/or if the system has information related to that individual, such as, e.g., wherein such an individual is famous and/or a well known celebrity or the like and their information is contained in a database).

In addition, in some embodiments, a calculator module can be used to output a variety of time-based designations (such as, e.g., seconds from event, minutes from event, days from event, weeks from event, months form event, and/or the like) based upon one or more date and/or time entered. In this manner, a user can enjoy the system by being able to learn, e.g., a person's age or a time from a certain event in various forms at a present time and/or at a particular other time.

In yet some other embodiments, calculations can include, e.g., a timer count down from or to an inputted event time and/or date. For example, people could send humorous e-cards saying, e.g., "You are now 180 minutes late and counting!" In some embodiments, a timer on a display screen of the displayed e-card could accurately reflect such tardiness to the recipient. As another illustrative example, people that may soon get together could send precursor cards saying, e.g., "I can't wait! We will get together in 1000 minutes!"

Among other things, by enabling users to calculate various values and/or to find out various pieces of information, greater interest may be developed in such a Web Site or the like. Similarly, enabling users to calculate various values may help users to find other reasons to "celebrate" and/or to communicate (such as, e.g., to send an e-card or other e-communication) using the system, thus potentially increasing sales and revenues.

7. Advertiser Account Features

In some preferred embodiments, advertisers, such as, e.g., various corporate entities can have user permissioned (e.g., using User ID, passwords, and/or the like) access to personalized account Web Pages or similar user interfaces of the e-card or the like service provider. Preferably, such personalized interfaces can include one or more of the following features:

- An e-card selection and/or creation feature in which an advertiser can select and/or create e-cards with their personalized ads inserted therein which can be selected by users: In this regard, such functionality as described above related to the creation of e-cards and/or e-advertisements can be employed.
- An e-card review and approval feature in which an advertiser can view sample e-cards created: In some embodiments, samples could be those generally available to a plurality of advertisers. In some embodiments, samples could be specially made for the advertiser, such as, e.g., by the e-card service provider, by another entity employed by the advertiser and/or by another entity for review by the advertiser.
- A coupon selection feature in which an advertiser can select and/or create coupons, discounts, value items, rebates, rewards, points, gift certificates and/or the like to be presented to certain users: For example, an advertiser may elect to give users that distribute over a certain threshold of advertisements to other recipients and/or that meets certain goals. In some embodiments, the advertiser may publish these rewards and the like and may create a clear reward structure for users to follow. In other embodiments, an advertiser can keep this information confidential. In some embodiments, rewards, etc., may be handled independently of the personalized interface available to the advertisers (i.e., they may handle this internally in some embodiments based on information received from the e-card service provider or the like).
- A payment plan feature at which an advertiser may potentially select new payment plans and/or the like, such as, e.g., monthly accounts, a pay per usage plan and/or the like.
- A payment feature whereby an advertiser can make on-line payments.
- A demographic consumer data review feature, whereby an advertiser can review and analyze consumer information acquired, or whereby an advertiser can send further advertisements to consumers and/or the like.

Broad Scope of the Invention

While illustrative embodiments of the invention have been described herein, the present invention is not limited to the various preferred embodiments described herein, but includes any and all embodiments having modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A computer-implemented method for the electronic distribution of advertisements, said method comprising:
    a. generating, by a computer, a shell electronic greeting card including a primary message which a user wishes to convey to at least one recipient;
    b. modifying, by a computer, said shell electronic greeting card to generate a modified electronic greeting card which includes an advertisement integrated into said shell electronic greeting card, said advertisement including information regarding at least one consumer product, said advertisement being integrated into the shell electronic greeting card such that when seen the advertisement may be perceived by said at least one recipient as part of said modified electronic greeting card without interfering with said primary message of said electronic greeting card; and
    c. electronically transmitting by a computer and via the Internet the modified electronic greeting card to said at least one recipient.

2. The computer-implemented method as claimed in claim 1, further comprising said shell electronic greeting card providing a primary message related to at least one of the following: an invitation to an event; a holiday, a life event, or a general greeting.

3. The computer-implemented method as claimed in claim 2, further comprising said shell electronic greeting card providing a primary message related to at least one of the following: Holidays; Religious Holidays; Catholic Holidays; Protestant Holidays; Jewish Holidays; Islamic Holidays; Non-Religious Holidays; Mother's Day; April Fool's Day; Birthdays; Family Birthday; Best Friend Birthday; Belated Birthday; Mother Birthday; Father Birthday; Sister Birthday; Daughter Birthday; Son Birthday; Husband Birthday; Wife Birthday; Grandchild Birthday; Grandparent Birthday; Thinking of You; Missing You; Congratulations; Get Well; Sympathy; Thank You; You're Welcome.

4. The computer-implemented method as claimed in claim 1, further comprising providing said primary message within at least one message region within said shell electronic greeting card.

5. The computer-implemented method as claimed in claim 4, further comprising providing said advertisement within at least one advertisement region within said modified electronic greeting card.

6. The computer-implemented method as claimed in claim 5, wherein said at least one advertisement region is fixed in relation to said at least one message region.

7. The computer-implemented method as claimed in claim 5, wherein said at least one advertisement region is mobile in relation to said at least one message region.

8. The computer-implemented method as claimed in claim 5, further comprising providing said at least one advertisement region containing at least one image related to the consumer product.

9. The computer-implemented method as claimed in claim 5, further comprising providing said at least one advertisement region containing at least one hyperlink.

10. The computer-implemented method as claimed in claim 1, wherein electronically transmitting by a computer and via the Internet further comprises sending said modified electronic greeting cards using email; text messaging; or facsimile.

11. The computer-implemented method as claimed in claim 1, further comprising the step of enabling the user to select said shell electronic greeting card from a list comprised of a plurality of shell electronic greeting cards.

12. The computer-implemented method as claimed in claim 1, further comprising the step of enabling the user to select said advertisement.

13. The computer-implemented method as claimed in claim 1, further comprising the step of enabling the compensation of at least one entity in connection with said step of electronically transmitting via the Internet said modified electronic greeting card to said at least one recipient.

14. The computer-implemented method as claimed in claim 13, wherein said at least one entity is the provider of the computer on which said electronic greeting card is generated.

15. The computer-implemented method as claimed in claim 13, wherein said at least one entity is a user of the computer on which said electronic greeting card is generated.

16. The computer-implemented method as claimed in claim 1, wherein said modified electronic greeting card includes an audio portion.

17. The computer-implemented method as claimed in claim 1, further comprising said advertisement being part of said primary message.

18. The computer-implemented method as claimed in claim 1, further comprising said advertisement being secondary to said primary message.

19. A system for the electronic distribution of advertisements, comprising:
   a computer processing element configured to (1) generate a shell electronic greeting card including a primary message which a user wishes to convey to at least one recipient and (2) modify said shell electronic greeting card to generate a modified electronic greeting card which includes an advertisement integrated into said shell electronic greeting card, said advertisement including information regarding at least one consumer product, said advertisement being integrated into the shell electronic greeting card such that the advertisement when seen may be perceived by said at least one recipient as part of said modified electronic greeting card without interfering with said primary message of said modified electronic greeting card; and
   a computer communications element configured to electronically transmit via the Internet the modified electronic greeting card to the at least one recipient.

20. The system of claim 19, wherein the primary message relates to at least one of the following: an invitation to an event; a holiday, a life event, or a general greeting.

21. The system of claim 20, wherein the primary message relates to at least one of the following: Holidays; Religious Holidays; Catholic Holidays; Protestant Holidays; Jewish Holidays; Islamic Holidays; Non-Religious Holidays; Mother's Day; April Fool's Day; Birthdays; Family Birthday; Best Friend Birthday; Belated Birthday; Mother Birthday; Father Birthday; Sister Birthday; Daughter Birthday; Son Birthday; Husband Birthday; Wife Birthday; Grandchild Birthday; Grandparent Birthday; Thinking of You; Missing You; Congratulations; Get Well; Sympathy; Thank You; You're Welcome.

22. The system of claim 19, wherein said computer processing element is further configured to generate the shell electronic greeting card with said primary message located within at least one message region within said shell electronic greeting card.

23. The system of claim 22, wherein said computer processing element is further configured to generate the shell electronic greeting card with said advertisement located within at least one advertisement region within said modified electronic greeting card.

24. The system of claim 23, wherein said computer processing element is further configured to generate the shell electronic greeting card with said at least one advertisement region fixed in relation to said at least one message region.

25. The system of claim 23, wherein said computer processing element is further configured to generate the shell electronic greeting card with said at least one advertisement region being mobile in relation to said at least one message region.

26. The system of claim 23, wherein said computer processing element is further configured to generate the shell electronic greeting card with said at least one advertisement region containing at least one image related to the consumer product.

27. The system of claim 23, wherein said computer processing element is further configured to generate the shell electronic greeting card with said at least one advertisement region containing at least one hyperlink.

28. The system of claim 19, wherein said computer communications element is configured to transmit said modified electronic greeting cards using email; text messaging; or facsimile.

29. The system of claim 19, wherein said computer processing element is further configured to receive a user selection of said shell electronic greeting card from a plurality of shell electronic greeting cards.

30. The system of claim 19, wherein said computer processing element is further configured to receive a user selected advertisement.

31. The system of claim 30, wherein said computer processing element is further configured to determine compensation for the provider of the system on which said electronic greeting card is generated.

32. The system of claim 30, wherein said computer processing element is further configured to determine compensation for a user of the system on which said electronic greeting card is generated.

33. The system of claim 19, wherein said computer processing element is further configured to determine compensation for at least one entity in connection with electronically transmitting via the Internet said modified electronic greeting card to the at least one recipient.

34. The system of claim 19, wherein said computer processing element is further configured to generate said modified electronic greeting card including an audio portion.

35. The system of claim 19, wherein said computer processing element is further configured to generate said modified electronic greeting card having said advertisement being part of said primary message.

36. The system of claim 19, wherein said computer processing element is further configured to generate said modified electronic greeting card having said advertisement being secondary to said primary message.

37. A computer-implemented method for the electronic distribution of advertisements, said method comprising:
   a. generating, by a computer, a shell electronic greeting card including a primary message which a user wishes to convey to at least one recipient;

b. modifying, by a computer, said shell electronic greeting card to generate a modified electronic greeting card which include an advertisement integrated into said shell electronic greeting card, said advertisement including information regarding at least one consumer product, said advertisement being integrated into the shell electronic greeting card such that when seen the advertisement may be perceived by said at least one recipient as part of said modified electronic greeting card without interfering with said primary message of said modified electronic greeting card; and c. electronically transmitting by a computer and via the internet an invitation to view the modified electronic greeting card to said at least one recipient.

38. The computer-implemented method as claimed in claim 37, further comprising said shell electronic greeting card providing a primary message related to at least one of the following: an invitation to an event; a holiday, a life event, or a general greeting.

39. The computer-implemented method as claimed in claim 38, wherein said at least one entity is the provider of the computer on which said electronic greeting card is generated.

40. The computer-implemented method as claimed in claim 38, wherein said at least one entity is a user of the computer on which said electronic greeting card is generated.

41. The computer-implemented method as claimed in claim 38, further comprising said shell electronic greeting card providing a primary message related to at least one of the following: Holidays; Religious Holidays; Catholic Holidays; Protestant Holidays; Jewish Holidays; Islamic Holidays; Non-Religious Holidays; Mother's Day; April Fool's Day; Birthdays; Family Birthday; Best Friend Birthday; Belated Birthday; Mother Birthday; Father Birthday; Sister Birthday; Daughter Birthday; Son Birthday; Husband Birthday; Wife Birthday; Grandchild Birthday; Grandparent Birthday; Thinking of You; Missing You; Congratulations; Get Well; Sympathy; Thank You; You're Welcome.

42. The computer-implemented method as claimed in claim 37, further comprising providing said primary message within at least one message region within said shell electronic greeting card.

43. The computer-implemented method as claimed in claim 42, further comprising providing said advertisement within at least one advertisement region within said modified electronic greeting card.

44. The computer-implemented method as claimed in claim 43, wherein said at least one advertisement region is fixed in relation to said at least one message region.

45. The computer-implemented method as claimed in claim 43, wherein said at least one advertisement region is mobile in relation to said at least one message region.

46. The computer-implemented method as claimed in claim 43, further comprising providing said at least one advertisement region containing at least one image related to the consumer product.

47. The computer-implemented method as claimed in claim 43, further comprising providing said at least one advertisement region containing at least one hyperlink.

48. The computer-implemented method as claimed in claim 37, wherein electronically transmitting via the Internet further comprises sending said invitation using email; text messaging; or facsimile.

49. The computer-implemented method as claimed in claim 37, further comprising the step of enabling the user to select said shell electronic greeting card from a list comprised of a plurality of shell electronic greeting cards.

50. The computer-implemented method as claimed in claim 37, further comprising the step of enabling the user to select said advertisement.

51. The computer-implemented method as claimed in claim 37, further comprising the step of enabling the compensation of at least one entity in connection with said step of electronically transmitting via the Internet said invitation to said at least one recipient.

52. The computer-implemented method as claimed in claim 37, wherein said modified electronic greeting card includes an audio portion.

53. The computer-implemented method as claimed in claim 37, further comprising said advertisement being part of said primary message.

54. The computer-implemented method as claimed in claim 37, further comprising said advertisement being secondary to said primary message.

55. A system the electronic distribution of advertisements, comprising:

a computer processing element configured to (1) generate a shell electronic greeting card including a primary message which a user wishes to convey to at least one recipient and (2) modify said shell electronic greeting card to generate a modified electronic greeting card which includes an advertisement integrated into said shell electronic greeting card, said advertisement including information regarding at least one consumer product, said advertisement being integrated into the shell electronic greeting card such that the advertisement when seen may be perceived by said at least one recipient as part of said modified electronic greeting card without interfering with said primary message of said modified electronic greeting card; and a computer communications element configured to electronically transmit an invitation, via the Internet, to view the modified electronic greeting card to the at least one recipient.

56. The system of claim 55, wherein primary message relates to at least one of the following: an invitation to an event; a holiday, a life event, or a general greeting.

57. The system of claim 56, wherein primary message relates to at least one of the following: Holidays; Religious Holidays; Catholic Holidays; Protestant Holidays; Jewish Holidays; Islamic Holidays; Non-Religious Holidays; Mother's Day; April Fool's Day; Birthdays; Family Birthday; Best Friend Birthday; Belated Birthday; Mother Birthday; Father Birthday; Sister Birthday; Daughter Birthday; Son Birthday; Husband Birthday; Wife Birthday; Grandchild Birthday; Grandparent Birthday; Thinking of You; Missing You; Congratulations; Get Well; Sympathy; Thank You; You're Welcome.

58. The system of claim 55, wherein said computer processing element is further configured to generate the shell electronic greeting card with said primary message located within at least one message region within said shell electronic greeting card.

59. The system of claim 58, wherein said computer processing element is further configured to generate the shell electronic greeting card with said advertisement located within at least one advertisement region within said modified electronic greeting card.

60. The system of claim 59, wherein said computer processing element is further configured to generate the shell electronic greeting card with said at least one advertisement region fixed in relation to said at least one message region.

61. The system of claim 59, wherein said computer processing element is further configured to generate the shell electronic greeting card with said at least one advertisement region being mobile in relation to said at least one message region.

62. The system of claim 59, wherein said computer processing element is further configured to generate the shell electronic greeting card with said at least one advertisement region containing at least one image related to the consumer product.

63. The system of claim 59, wherein said computer processing element is further configured to generate the shell electronic greeting card with said at least one advertisement region containing at least one hyperlink.

64. The system of claim 55, wherein said computer communications element is further configured to transmit said invitation to view the modified electronic greeting card using email; text messaging; or facsimile.

65. The system of claim 55, wherein said computer processing element is further configured to receive a user selection of said shell electronic greeting card from a plurality of shell electronic greeting cards.

66. The system of claim 55, wherein said computer processing element is further configured to receive a user selected advertisement.

67. The system of claim 66, wherein said computer processing element is further configured to determine compensation for the provider of the system on which said electronic greeting card is generated.

68. The system of claim 66, wherein said computer processing element is further configured to determine compensation for a user of the system on which said electronic greeting card is generated.

69. The system of claim 55, wherein said computer processing element is further configured to determine compensation for at least one entity in connection with electronically transmitting via the Internet said modified electronic greeting card to the at least one recipient.

70. The system of claim 55, wherein said computer processing element is further configured to generate the modified electronic greeting card including an audio portion.

71. The system of claim 55, wherein said computer processing element is further configured to generate the modified electronic greeting card having said advertisement being part of said primary message.

72. The system of claim 55, wherein said computer processing element is further configured to generate the modified electronic greeting card having said advertisement being secondary to said primary message.

\* \* \* \* \*

UNITED STATES PATENT AND TRADEMARK OFFICE
CERTIFICATE OF CORRECTION

| | | |
|---|---|---|
| PATENT NO. | : 7,702,542 B2 | Page 1 of 1 |
| APPLICATION NO. | : 10/811390 | |
| DATED | : April 20, 2010 | |
| INVENTOR(S) | : Aslanian, Jr. | |

It is certified that error appears in the above-identified patent and that said Letters Patent is hereby corrected as shown below:

Claim 37:
Col. 27, line 3, change "include" to -- includes --

Claim 48:
Col. 27, line 61, change "transmitting via" to -- transmitting by a computer and via --

Claim 55:
Col. 28, line 18, change "system the" to -- system for the --

Signed and Sealed this
Fifth Day of July, 2011

David J. Kappos
*Director of the United States Patent and Trademark Office*